US010231093B2

(12) United States Patent
Cordova et al.

(10) Patent No.: US 10,231,093 B2
(45) Date of Patent: *Mar. 12, 2019

(54) METHODS AND SYSTEMS FOR DRIVER IDENTIFICATION

(71) Applicant: CENSIO, INC., Cambridge, MA (US)

(72) Inventors: Brad Cordova, Cambridge, MA (US); Joe Adelmann, Cambridge, MA (US)

(73) Assignee: TRUEMOTION, INC., Boston, MA (US)

( * ) Notice: Subject to any disclaimer, the term of this patent is extended or adjusted under 35 U.S.C. 154(b) by 942 days.

This patent is subject to a terminal disclaimer.

(21) Appl. No.: 14/477,519

(22) Filed: Sep. 4, 2014

(65) Prior Publication Data
US 2014/0370919 A1 Dec. 18, 2014

Related U.S. Application Data

(60) Division of application No. 14/192,452, filed on Feb. 27, 2014, now Pat. No. 8,862,486, which is a
(Continued)

(51) Int. Cl.
*G06Q 40/08* (2012.01)
*H04W 4/04* (2009.01)
(Continued)

(52) U.S. Cl.
CPC ............ *H04W 4/046* (2013.01); *B60W 40/09* (2013.01); *G06Q 40/08* (2013.01); *G07C 5/085* (2013.01);
(Continued)

(58) Field of Classification Search
CPC .................................................... G06Q 40/08
See application file for complete search history.

(56) References Cited

U.S. PATENT DOCUMENTS 7,209,886 B2   4/2007 Kimmel et al.
8,117,049 B2   2/2012 Berkobin et al.
(Continued)

FOREIGN PATENT DOCUMENTS

WO    WO 2012/097441 A1    7/2012
WO    WO 2014/105846 A1    7/2014

OTHER PUBLICATIONS

In Vehicle Driver Detection Using Mobile Phone Sensors by Hon Lung Chu on 4/20/11 12 pages attached (Year: 2011).*
(Continued)

*Primary Examiner* — Bruce I Ebersman
(74) *Attorney, Agent, or Firm* — Kilpatrick Townsend & Stockton LLP

(57) ABSTRACT

A method of determining a position of a mobile device in a vehicle includes obtaining accelerometer data collected using a accelerometer in the mobile device, obtaining angular orientation data collected using a gyroscope in the mobile device, and determining a start time of a driving event. The method also includes determining an entry side for the mobile device prior to the driving event, detecting an acceleration event, aligning the mobile device to a reference frame of the vehicle, and determining a front/back location of the mobile device. The method further includes detecting a braking event, determining an end time of the driving event, determining an exit side for the mobile device after the driving event, and determining the position of the mobile device during at least a portion of the driving event.

8 Claims, 34 Drawing Sheets

Related U.S. Application Data continuation of application No. 14/139,510, filed on Dec. 23, 2013, now Pat. No. 9,398,423.

(60) Provisional application No. 61/745,931, filed on Dec. 26, 2012, provisional application No. 61/745,934, filed on Dec. 26, 2012, provisional application No. 61/745,935, filed on Dec. 26, 2012, provisional application No. 61/882,383, filed on Sep. 25, 2013.

(51) Int. Cl.
*G07C 5/08* (2006.01)
*B60W 40/09* (2012.01)

(52) U.S. Cl.
CPC ... *B60W 2420/905* (2013.01); *B60W 2520/14* (2013.01); *G07C 5/08* (2013.01)

(56) References Cited

U.S. PATENT DOCUMENTS

| | | | |
|---|---|---|---|
| 8,140,358 | B1 | 3/2012 | Ling et al. |
| 8,165,916 | B2 | 4/2012 | Hoffberg et al. |
| 8,284,039 | B2 | 10/2012 | Baker et al. |
| 8,285,439 | B2 | 10/2012 | Hodges et al. |
| 8,290,480 | B2 * | 10/2012 | Abramson ............... H04L 67/12 455/418 |
| 8,296,007 | B2 | 10/2012 | Swaminathan et al. |
| 8,311,858 | B2 | 11/2012 | Everett et al. |
| 8,595,034 | B2 | 11/2013 | Bauer et al. |
| 8,862,486 | B2 | 10/2014 | Cordova et al. |
| 9,700,716 | B2 * | 7/2017 | Faltys ................. A61N 1/0556 |
| 2004/0236596 | A1 | 11/2004 | Chowdhary et al. |
| 2007/0136107 | A1 | 6/2007 | Maguire et al. |
| 2008/0065427 | A1 | 3/2008 | Helitzer et al. |
| 2008/0154629 | A1 * | 6/2008 | Breed .................. B60N 2/2863 705/1.1 |
| 2009/0043449 | A1 | 2/2009 | Matsuura et al. |
| 2010/0063768 | A1 * | 3/2010 | Lagouge ................ G01C 21/26 702/154 |
| 2010/0131304 | A1 | 5/2010 | Collopy et al. |
| 2010/0205012 | A1 | 8/2010 | McClellan et al. |
| 2011/0125394 | A1 | 5/2011 | Horstemeyer |
| 2011/0153367 | A1 | 6/2011 | Amigo et al. |
| 2011/0164037 | A1 * | 7/2011 | Yoshida ................. G06T 15/08 345/419 |
| 2012/0071151 | A1 | 3/2012 | Abramson et al. |
| 2012/0072244 | A1 | 3/2012 | Collins et al. |
| 2012/0150651 | A1 * | 6/2012 | Hoffberg ............... G06F 3/0482 705/14.58 |
| 2012/0197669 | A1 | 8/2012 | Kote et al. |
| 2012/0209634 | A1 | 8/2012 | Ling et al. |
| 2012/0214463 | A1 | 8/2012 | Smith et al. |
| 2012/0316913 | A1 * | 12/2012 | Reyes .................... G06Q 50/08 705/7.23 |
| 2013/0006674 | A1 | 1/2013 | Bowne et al. |
| 2013/0316310 | A1 * | 11/2013 | Musicant ............. G01P 15/003 434/65 |
| 2014/0149145 | A1 | 5/2014 | Peng et al. |
| 2014/0180730 | A1 | 6/2014 | Cordova et al. |
| 2014/0180731 | A1 | 6/2014 | Cordova et al. |

OTHER PUBLICATIONS

U.S. Appl. No. 14/139,510, "Non-Final Office Action", dated Jul. 9, 2015, 13 pages.
U.S. Appl. No. 14/139,510, "Notice of Allowance", dated Mar. 28, 2016, 10 pages.
U.S. Appl. No. 14/192,452, "Non Final Office Action", dated Apr. 25, 2014, 10 pages.
U.S. Appl. No. 14/192,452, "Notice of Allowance", dated Jun. 10, 2014, 13 pages.
Notification of Transmittal of the International Search Report and the Written Opinion of the International Searching Authority, or the Declaration and International Search Report and Written Opinion of the International Searching Authority for International Application No. PCT/US2013/077544 dated Aug. 5, 2014, 11 pages.
Non-Final Office Action for U.S. Appl. No. 14/192,452 dated Apr. 25, 2014, 9 pages.
Notice of Allowance for U.S. Appl. No. 14/192,452 dated Jun. 10, 2014, 11 pages.

* cited by examiner

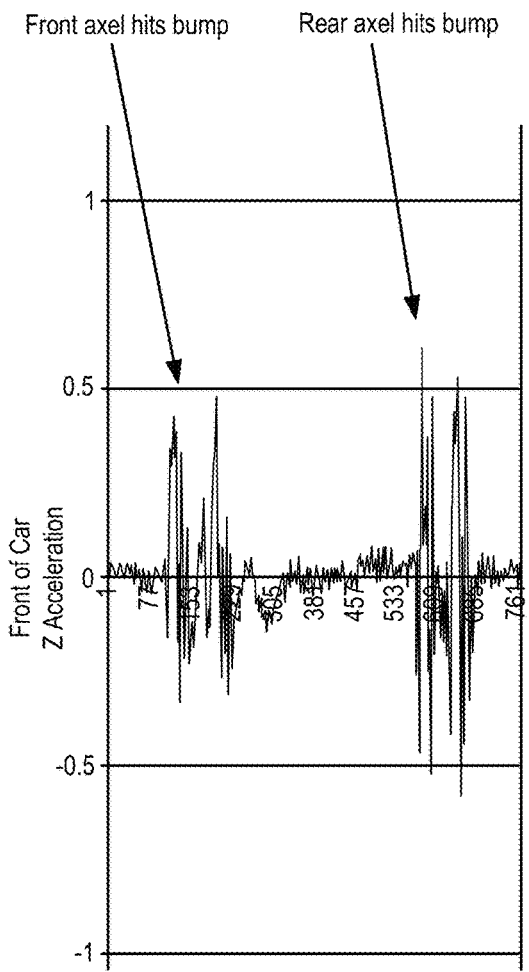 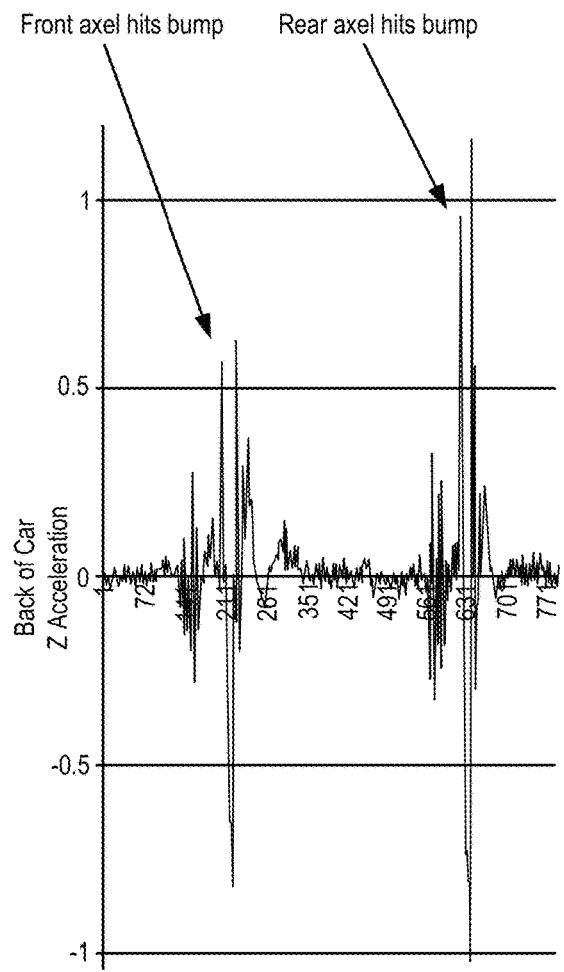
FIG. 18B  FIG. 18C

|  |  | Test Sequence Number | | | | |
|---|---|---|---|---|---|---|
|  |  | 1 | 2 | 3 | 4 | 5 |
| Front of Vehicle | a | sum(zpos) | 58.615213 | -16.644053 | 20.054449 | 32.039489 | 10.356112 |
|  | b | sum(zneg) | 187.740223 | 101.235526 | 92.982013 | 83.786291 | 69.428737 |
|  | c | [sum(zpos)-sum(zneg)]/sum(zpos) | -2.202926568 | 7.082384261 | -3.63647807 | -1.615094485 | -5.704131531 |
| Back of Vehicle | a | sum(zpos) | -139.54097 | -83.453609 | -84.23569 | -68.87286 | -143.465698 |
|  | b | sum(zneg) | 2.278604 | -39.794209 | -38.666376 | -59.395322 | -96.072904 |
|  | c | [sum(zpos)-sum(zneg)]/sum(zpos) | 1.016329283 | 0.523157722 | 0.540973951 | 0.137609183 | 0.330342337 |

FIG. 19B

Legend
a = the sum of all z acceleration values corresponding to positive y acceleration values
b = the sum of all z acceleration values corresponding to negative y acceleration values
c = (a-b)/a

METHODS AND SYSTEMS FOR DRIVER IDENTIFICATION

CROSS-REFERENCES TO RELATED APPLICATIONS

This application is a division of U.S. patent application Ser. No. 14/192,452, filed on Feb. 27, 2014, which is a continuation of U.S. application Ser. No. 14/139,510, filed on Dec. 23, 2013; which claims priority to U.S. Provisional Patent Application Nos. 61/745,931, 61/745,934, and 61/745,935, all filed on Dec. 26, 2012 and 61/882,383, filed on Sep. 25, 2013, the disclosures of which are hereby incorporated by reference in their entirety for all purposes.

BACKGROUND OF THE INVENTION

For insurance and other purposes, driving behavior has been a topic of interest. Some systems have been developed to track driving behaviors including speed and trip duration. As an example external devices have been integrated with vehicles to track driving behavior. Some insurance companies use a device that plugs into the vehicles on-board diagnostic port to read data from the vehicle's computer to better model risk. This hardware solution is limited in that it mainly measures vehicle-related data.

Despite the progress made in relation to providing data related to drivers and their vehicles, there is a need in the art for improved methods and systems related to driver identification.

SUMMARY OF THE INVENTION

Embodiments of the present invention relate to transportation systems. More particularly, embodiments relate to methods and systems to determine time periods during which a user is moving in a vehicle. In a particular embodiment, whether or not a person is driving a vehicle is determined. Such data can be utilized in determining risk profiles and other insurance-related computations.

According to an embodiment of the present invention, a method of determining vehicle entry information for a user is provided. The method includes obtaining a yaw measurement using a mobile device, determining, using a processor, a first time span associated with a user entering a vehicle, and determining, using the processor, a second time span associated with a user exiting the vehicle. The method also includes determining that a change in magnitude over a portion of the yaw measurement is greater than a predetermined threshold (e.g., 40°) over at least one of the first time span or the second time span, and determining an angular change of the yaw measurement over the predetermined threshold. The method further includes associating right hand entry with the vehicle entry information if the angular orientation of the yaw measurement is clockwise and associating left hand entry with the vehicle entry information if the angular orientation of the yaw measurement is counterclockwise.

In an embodiment, the yaw measurement is measured in a counterclockwise direction around a z-axis aligned with an acceleration due to gravity vector. As an example, the yaw measurement for left hand entry can include a substantially constant positive value between the first time span and the second time span and the yaw measurement for right hand entry can include a substantially constant negative value between the first time span and the second time span.

In another embodiment, the yaw measurement can include an amplitude of yaw and a direction of yaw for the mobile device as a function of time. The start time associated with the driving event can preceded by a walking event and the end time associated with the driving event can be followed by a walking event.

According to a specific embodiment of the present invention, a method of aligning a mobile device having an accelerometer, a gyroscope, and an alignment axis to a reference frame of a vehicle is provided. The method includes placing the mobile device in the vehicle, obtaining data from the accelerometer of the mobile device, and detecting, one or more braking events and one or more forward acceleration events during a driving event. The method also includes determining, using the accelerometer of the mobile device, a direction of travel of the vehicle with respect to the reference frame of the vehicle, and obtain angular measurement data from the gyroscope of the mobile device. The method further includes aligning, using the angular measurement data, the alignment axis of the mobile device to the reference frame of the vehicle.

In an embodiment, the one or more braking events and the one or more forward acceleration events are characterized by at least one of a magnitude of acceleration projected onto an x-y plane having a normal aligned with acceleration due to gravity, a standard deviation, a mean, kurtosis, skew, a maximum value, a minimum value, wavelet coefficients, FFT coefficients, or features calculated using unsupervised feature selection methods including at least one of Sparse Auto-Encoders or Restricted Boltzmann Machines. Moreover, the one or more braking events and the one or more forward acceleration events can be characterized by a duration, a time stamp, and a magnitude of acceleration over a predetermined threshold.

As an example, determining the direction of travel of the vehicle can include projecting the data from the accelerometer onto each axis of an x-y plane having a normal aligned with acceleration due to gravity through an angle of 360 degrees in predetermined increments, determining an angle at which acceleration along at least one of the x or y axes is a maximum, and defining the direction of travel of the vehicle as the angle at which acceleration along at least one of the x or y axes is a maximum. Placing the mobile device in the vehicle can result from a user having the mobile device entering the vehicle or the user placing an item enclosing the mobile device inside the vehicle.

In another example, the method also includes determining that the direction of travel of the vehicle with respect to the reference frame of the vehicle is backwards and adjusting the angle at which acceleration along at least one of the x or y axes is a maximum by 180 degrees.

In one embodiment of the present invention, a method for determining if a user is backing out of a parking space or pulling into a parking space is provided. The method includes, after driving has been detected, aligning the y-axis of the mobile device to the vehicle on initial acceleration and starting a countdown timer. In some implementations, the initial acceleration direction is assumed to be in the negative Y-direction, although this is not required by the present invention. The method also includes counting subsequent forward acceleration and braking events and recording the signs (either positive or negative) of each of these events.

A determination is made if a predetermined time (e.g., 60 seconds) has elapsed since the countdown timer was started. If this predetermined time has elapsed, then paired braking and forward acceleration events are counted for which no sign change after the initial acceleration. If the number of paired events is even, then a determination is made that the user pulled forward out of the parking space. If the number of paired events is odd, then a determination is made that the user pulled backward out of the parking space.

If this predetermined time has not elapsed, then paired braking and forward acceleration events are counted for which a sign change occurs between braking and forward acceleration after the initial acceleration. A determination is made if there are more than a predetermined number (e.g., 5) of such paired events. If this number has been met, then if the number of paired events is even, then a determination is made that the user pulled forward out of the parking space. If the number of paired events is odd, then a determination is made that the user pulled backward out of the parking space.

If the number has not been met, then a determination is made if a velocity over a predetermined speed (e.g., 25 mph) has been recorded for a predetermined period (e.g., 15 seconds). If the velocity has been sufficient for the predetermined period, then if the number of paired events is even, then a determination is made that the user pulled forward out of the parking space. If the number of paired events is odd, then a determination is made that the user pulled backward out of the parking space.

If the velocity has not been sufficient for the predetermined time, then a waiting period is implemented (e.g., 1 second), and the method returns to the determination if the predetermined time has elapsed.

In another example, the method can further include defining a longitudinal axis of the vehicle as the angle at which acceleration along at least one of the x or y axes is a maximum, transforming a y-axis of the mobile device to align with the longitudinal axis of the vehicle, and transforming an x-axis of the mobile device to align with a vector perpendicular to the longitudinal axis of the vehicle, wherein the vector perpendicular to the longitudinal axis of the vehicle is perpendicular to acceleration due to gravity.

According to a particular embodiment of the present invention, a method of determining a position of a mobile device in a vehicle is provided. The method includes obtaining accelerometer data collected using a accelerometer in the mobile device, obtaining angular orientation data collected using a gyroscope in the mobile device, and determining a start time of a driving event. The method also includes determining an entry side for the mobile device prior to the driving event, detecting an acceleration event, and aligning the mobile device to a reference frame of the vehicle. The method further includes determining a front/back location of the mobile device, detecting a braking event, determining an end time of the driving event, determining an exit side for the mobile device after the driving event, and determining the position of the mobile device during at least a portion of the driving event.

In an embodiment, determining at least one of the entry side for the mobile device or the exit side of for the mobile device can include measuring a yaw value for the mobile device associated with the start time. As an example, measuring the yaw value can include obtaining rotation data collected using the gyroscope in the mobile device, wherein the rotation data is with respect to a vector aligned with acceleration due to gravity and detecting a rotation in an x-y plane orthogonal to the vector aligned with acceleration due to gravity, wherein the rotation is greater than a predetermined threshold. Additionally, measuring the yaw value can include obtaining rotation data collected using the gyroscope in the mobile device, wherein the rotation data is with respect to a vector aligned with acceleration due to gravity and detecting a rotation in an x-y plane orthogonal to the vector aligned with acceleration due to gravity, wherein the rotation is characterized by a pattern associated with user entry.

As an example, determining the entry side of the mobile device can include providing acceleration data and yaw data, wherein a y-axis of the mobile device is aligned to a longitudinal axis of the vehicle and an x-axis of the mobile device is aligned to a transverse axis that is perpendicular to both the longitudinal axis of the vehicle and acceleration due to gravity, selecting a subset of the provided acceleration data and yaw data, wherein the subset is associated with a predetermined time around a start time of a driving event, and predicting an entry side for the mobile device using at least one of a vector-product-based method, an integral method, or a seatbelt-based method. Determining the entry side can also include selecting a second subset of the provided acceleration data and yaw data, wherein the second subset is associated with a driving time of the driving event and predicting a transverse position of the mobile device in the vehicle during the driving time using a centripetal acceleration method. The driving time is between the start time and the end time.

As another example, predicting at least one of the entry side or the exit side can include computing a weighted combination of predictions resulting from a plurality of at least one of a vector-product-based method, an integral method, or a seatbelt-based method. Additionally, determining the transverse position can include computing a weighted combination of at least a plurality of a yaw method, a centripetal acceleration method, a vector product method, or an integral method.

In a specific embodiment, the integral method comprises providing acceleration data and yaw data, wherein a y-axis of the mobile device is aligned to a longitudinal axis of the vehicle and an x-axis of the mobile device is aligned to a transverse axis that is perpendicular to both the longitudinal axis of the vehicle and acceleration due to gravity, selecting a subset of the provided acceleration data and yaw data, wherein the subset is associated with a predetermined time around a start time of a driving event, and determining a sign of an integral of the subset projected onto the x-axis the mobile device phone and calculated over a predetermined time window surrounding the start time. The integral method also includes predicting that the mobile device enters on the right side of the vehicle if the sign of the integral of the subset is positive, predicting that the phone enters on the left side of the vehicle if the sign of the integral of the subset is negative, and selecting a second subset of the provided acceleration data and yaw data, wherein the second subset is associated with a predetermined time around an end time of the driving event. The integral method further includes selecting a second subset of the provided acceleration data and yaw data, wherein the second subset is associated with a predetermined time around an end time of the driving event, determining a sign of an integral of the second subset projected onto the x-axis the mobile device and calculated over a predetermined time window surrounding the end time, predicting that the mobile device enters on the right side of the vehicle if the sign of the integral of the subset is positive, predicting that the phone exits on the left side of the vehicle if the sign of the integral of the second subset is positive, and predicting that the phone exits on the right side of the vehicle if the sign of the integral of the second subset is negative.

In a particular embodiment, determining the front/back location of the vehicle comprises obtaining acceleration data associated with a driving time of a driving event characterized by an initial entry signal and a terminal exit signal and determining a longitudinal position of the mobile device in the vehicle based on at least one of a bump detection method, paired Y,Z acceleration method. In another embodiment, determining the longitudinal position of the mobile device in the vehicle comprises computing a weighted combination of the bump detection method and the paired Y,Z acceleration method.

In another specific embodiment, the centripetal method comprises obtaining speed, acceleration, and yaw angle data for turns between 10 degrees and 90 degrees for a duration of between 0.4-5 seconds, matching sequential left turn/right turn pairs, and controlling for speed, yaw angle, turn duration, and turn radius. The centripetal method also includes adjusting centripetal acceleration based on the controlled speed, yaw angle, turn duration, and turn radius, determining a relative magnitude of the adjusted centripetal acceleration for left and right turns, and determining that the mobile device is located along the longitudinal center line of a vehicle if the magnitude of the adjusted centripetal acceleration is the same for left and right turns. The centripetal method further includes determining that the mobile device is located on the right side of a vehicle if the magnitude of the adjusted centripetal acceleration is greater for left turns and determining that the mobile device is located on the left side of a vehicle if the magnitude of the adjusted centripetal acceleration is greater for right turns.

In another particular embodiment, the vector-product-based method comprises providing acceleration data and yaw data, wherein a y-axis of the mobile device is aligned to a longitudinal axis of the vehicle and an x-axis of the mobile device is aligned to a transverse axis that is perpendicular to both the longitudinal axis of the vehicle and acceleration due to gravity, selecting a subset of the provided acceleration data and yaw data, wherein the subset is associated with a predetermined time around a start time of a driving event, and determining a sign of accelerations in the subset projected onto the x-axis of the mobile device and a sign of accelerations in the subset projected onto the y-axis of the mobile device. The vector-product-based method also includes predicting that the phone enters on the left side of the vehicle if the sign of accelerations in the subset projected onto the x-axis and the sign of accelerations in the subset projected onto the y-axis are the same, predicting that the phone enters on the right side of the vehicle if the sign of accelerations in the subset projected onto the x-axis and the sign of accelerations in the subset projected onto the y-axis are opposite, and selecting a second subset of the provided acceleration data and yaw data, wherein the second subset is associated with a predetermined time around an end time of the driving event. The vector-product-based method further includes determining a sign of accelerations in the second subset projected onto the x-axis of the mobile device and a sign of accelerations in the second subset projected onto the y-axis of the mobile device, predicting that the phone exits on the right side of the vehicle if the sign of accelerations in the second subset projected onto the x-axis and the sign of accelerations in the second subset projected onto the y-axis are the same, and predicting that the phone exits on the left side of the vehicle if the sign of accelerations in the second subset projected onto the x-axis and the sign of accelerations in the second subset projected onto the y-axis are opposite.

As an example, the bump detection method can include detecting bumps between the initial entry signal and the terminal exit signal. For instance, bump detection method can include obtaining acceleration data aligned with the z-axis, detecting if z-axis acceleration values are greater than a predetermined threshold, and detecting a bump. The bump detection method can also include detecting if there are two z-acceleration values above a second predetermined threshold within a predetermined time period, determining that a bump was hit by the front axle and the back axle of the vehicle, and comparing a magnitude of the z-acceleration associated with the bump being hit by the front axle and the z-acceleration associated with the bump being hit by the back axle. The bump detection method can further include determining that the mobile device is in the front of the vehicle if the z-acceleration associated with the bump being hit by the front axle and the z-acceleration associated with the bump being hit by the back axle are approximately equivalent and determining that the mobile device is in the back of the vehicle if the z acceleration z-acceleration associated with the bump being hit by the front axle is less than the z-acceleration associated with the bump being hit by the back axle.

As an example, the predetermined time period can be a function of vehicle speed and wheelbase. Moreover, determining the position of the mobile device can include using a weighted combination of a plurality of left/right determination methods. As discussed herein, the plurality of left/right determination methods can include at least two of a centripetal acceleration method, a vector product method, or an integral method. Moreover, the paired Y,Z acceleration method can include placing the mobile device in the vehicle, obtaining data from the accelerometer of the mobile device, detecting, one or more braking events and one or more forward acceleration events during a driving event, determining, using the accelerometer of the mobile device, a direction of travel of the vehicle with respect to the reference frame of the vehicle, and obtaining angular measurement data from the gyroscope of the mobile device. The paired Y,Z acceleration method can also include aligning, using the angular measurement data, the alignment axis of the mobile device to the reference frame of the vehicle, collecting and pairing a plurality of z accelerations for y acceleration data with matching magnitude and opposite sign, computing the value of "a", where "a"=the sum of all z acceleration values corresponding to positive y acceleration values, and computing the value of "b", where "b"=the sum of all z acceleration values corresponding to negative y acceleration values. The paired Y,Z acceleration method can further include determining that the mobile device is in the back of the vehicle if "a" and "b" both have negative signs, determining that the mobile device is in the front of the vehicle if "a" and "b" both have positive signs, calculating the value of "c", where c=[(a−b)/a] if "a" and "b" have opposite signs, determining that the mobile device is in the front of the vehicle if the absolute value of "c" is greater than or equal to 1, and determining that the mobile device is in the back of the vehicle if the absolute value of "c" is less than 1.

According to an embodiment of the present invention, a method of determining vehicle entry information for a user is provided. The method includes obtaining a yaw measurement using a mobile device, determining, using a processor, a start time associated with a driving event, and determining, using the processor, an end time associated with the driving event. The method also includes determining that a magnitude of the yaw measurement is greater than a predetermined threshold, determining an angular orientation of the yaw measurement, associating right hand entry with the vehicle entry information if the angular orientation of the yaw measurement is clockwise, and associating left hand entry with the vehicle entry information if the angular orientation of the yaw measurement is counter-clockwise.

In an embodiment, the predetermined threshold is 40°. The yaw measurement may include an amplitude of yaw for the mobile device as a function of time. The start time associated with the driving event can be preceded by a walking event and the end time associated with the driving event can be followed by a walking event. The yaw measurement is typically made with respect to a longitudinal axis of the vehicle. In an embodiment, the yaw measurement for left hand entry comprises a substantially constant positive value between the start time and the end time and the yaw measurement for right hand entry comprises a substantially constant negative value between the start time and the end time.

According to another embodiment of the present invention, a method of aligning a mobile device having an accelerometer and an alignment axis to a reference frame of a vehicle is provided. The method includes placing the mobile device in the vehicle, obtaining data from the accelerometer of the mobile device, and detecting at least one of a decrease in the data from the accelerometer greater than an amplitude threshold during a predetermined time period or an amplitude increase in the accelerometer greater than a second amplitude threshold during a second predetermined time period. The method also includes determining, using the accelerometer of the mobile device, a direction of travel of the vehicle with respect to the reference frame of the vehicle and aligning the alignment axis of the mobile device to the reference frame of the vehicle.

In an exemplary embodiment, the amplitude threshold and the second amplitude threshold are equal. In another exemplary embodiment, the predetermined time period and the second predetermined time period are equal. Determining the direction of travel of the vehicle may include rotating the data from the accelerometer around a z-axis by 360 degrees in predetermined increments and determining a maximum value of acceleration along a y-axis.

Additionally, aligning the alignment axis of the mobile device to the reference frame of the vehicle may include transforming acceleration data associated with the phone to correlate with acceleration data associated with the vehicle. The acceleration data associated with the vehicle has a z-axis aligned with acceleration due to gravity and a maximum during braking along a longitudinal axis. Moreover, placing the mobile device in the vehicle may result from a user having the mobile device entering the vehicle.

According to a particular embodiment of the present invention, a method of determining a position of a mobile device in a vehicle is provided. The method includes obtaining accelerometer data collected using a gyroscope in the mobile device, determining a start time of a driving event, determining an entry side for the mobile device prior to the driving event, and detecting an acceleration event. The method also includes aligning the mobile device to a reference frame of the vehicle, determining a front/back location of the mobile device, detecting a braking event, and determining an end time of the driving event. The method further includes determining an exit side for the mobile device after the driving event and determining the position of the mobile device during at least a portion of the driving event.

Determining the entry side for the mobile device may include measuring a yaw value for the mobile device associated with the start time. Determining the position of the mobile device may include using a weighted average of a plurality of left/right determination methods, for example, a centripetal acceleration method, a vector product method, or an integral method.

Numerous benefits are achieved by way of the present invention over conventional techniques. In contrast with previous methods that are lacking in the ability to attribute the data collected during the drive to a particular individual, implementations contained within this patent solve several problems by using the ubiquitous smartphone to tell exactly when someone is driving a vehicle. In this way, it is possible to verify that the data being collected is actually attributed to the correct user. For example, embodiments of the present invention provide users with the ability to learn how to improve their driving behaviors while saving money on car insurance. The system can provide feedback about driving behaviors only when a user is a driver (not a passenger), which allows users to prove to insurance companies that they are driving safely. This system also helps insurance companies because it allows them to incentivize safe driving, lowers claim payment variance, and provides for better risk modeling. On a larger scale, the system helps society by reducing accidents. These and other embodiments of the invention along with many of its advantages and features are described in more detail in conjunction with the text below and attached figures.

BRIEF DESCRIPTION OF THE DRAWINGS

FIG. 8B-1 is a simplified plot of roll as a function of time for a passenger entering a vehicle with a phone in an inside pocket according to an embodiment of the present invention.

FIG. 8B-2 is a simplified plot of pitch as a function of time for a passenger entering a vehicle with a phone in an inside pocket according to an embodiment of the present invention.

FIG. 8C-1 is a simplified plot of roll as a function of time for a passenger entering a vehicle with a phone in an outside pocket according to an embodiment of the present invention.

FIG. 8C-2 is a simplified plot of pitch as a function of time for a passenger entering a vehicle with a phone in an outside pocket according to an embodiment of the present invention.

FIG. 8D-1 is a simplified plot of roll as a function of time for a driver entering a vehicle with a phone in an inside pocket according to an embodiment of the present invention.

FIG. 8D-2 is a simplified plot of pitch as a function of time for a driver entering a vehicle with a phone in an inside pocket according to an embodiment of the present invention.

FIG. 8E-1 is a simplified plot of roll as a function of time for a driver entering a vehicle with a phone in an outside pocket according to an embodiment of the present invention.

FIG. 8E-2 is a simplified plot of pitch as a function of time for a driver entering a vehicle with a phone in an outside pocket according to an embodiment of the present invention.

FIGS. 18B and 18C are plots of Z acceleration data as a function of time for two locations in a vehicle.

FIG. 19B is a table containing data used in determining the front vs. back location as illustrated in FIG. 19A.

DETAILED DESCRIPTION OF SPECIFIC EMBODIMENTS

Embodiments of the present invention relate to driver identification. More particularly, embodiments relate to methods and systems to determine time periods during which a user is moving in a vehicle. In a particular embodiment, whether or not a person is driving a vehicle is determined. Such data can be utilized in determining risk profiles and other insurance-related computations.

Figure 1:
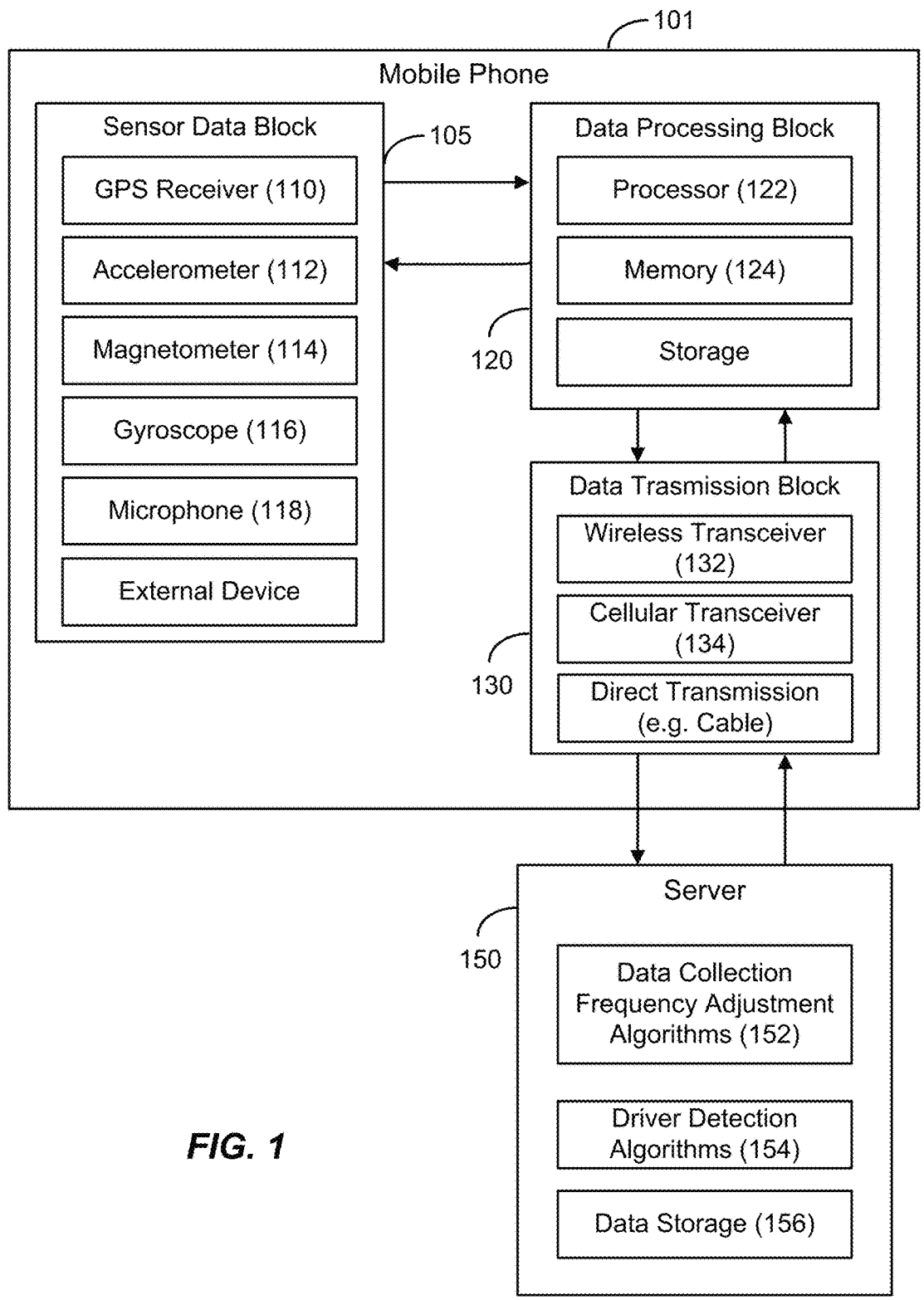
FIG. 1 is a simplified system diagram illustrating a driver identification system according to an embodiment of the present invention.

FIG. 1 is a simplified system diagram illustrating a driver identification system according to an embodiment of the present invention. The system includes a mobile phone 101 having a number of different components. Although embodiments of the present invention discuss the driver identification system in terms of phones, in particular smart phones, embodiments of the present invention are not limited to this particular mobile device and other mobile devices are included within the scope of the present invention. As examples, a variety of mobile devices including sensors such as accelerometers, location determination systems such as GPS receivers, communications abilities, and the like are included within the scope of the invention, including smart watches, fitness monitors, Bluetooth headsets, tablets, laptop computers, movement analysis device, and the like. Thus, although for clarity of description, references are made herein to phones, the present invention is not limited to these particular mobile devices. One of ordinary skill in the art would recognize many variations, modifications, and alternatives.

The mobile phone 101 includes a sensor data block 105, a data processing block 120, and a data transmission block 130. The sensor data block 105 includes all data collection sensors as well as data collected from said sensors that are available to the phone, this can include external devices connected via Bluetooth, USB cable, etc. The data processing block 120 includes storage, and manipulations done to the data obtained from the sensor data block 105, this includes, but is not limited to, subsampling, filtering, reformatting, etc. The data transmission block includes any transmission of the data off the phone to an external computing device that can also store and manipulate the data obtained from the sensor data block 105.

The driver identification system also includes a server 150 that communicates with the mobile phone 101. The server 150 provides functionality including data collection frequency adjustment algorithms 152 as discussed in relation to FIG. 4 below. These and other algorithms are executed by processors (not shown) in conjunction with memory (not shown). The server also includes driver detection algorithms 154 and data storage 156.

Figure 2:
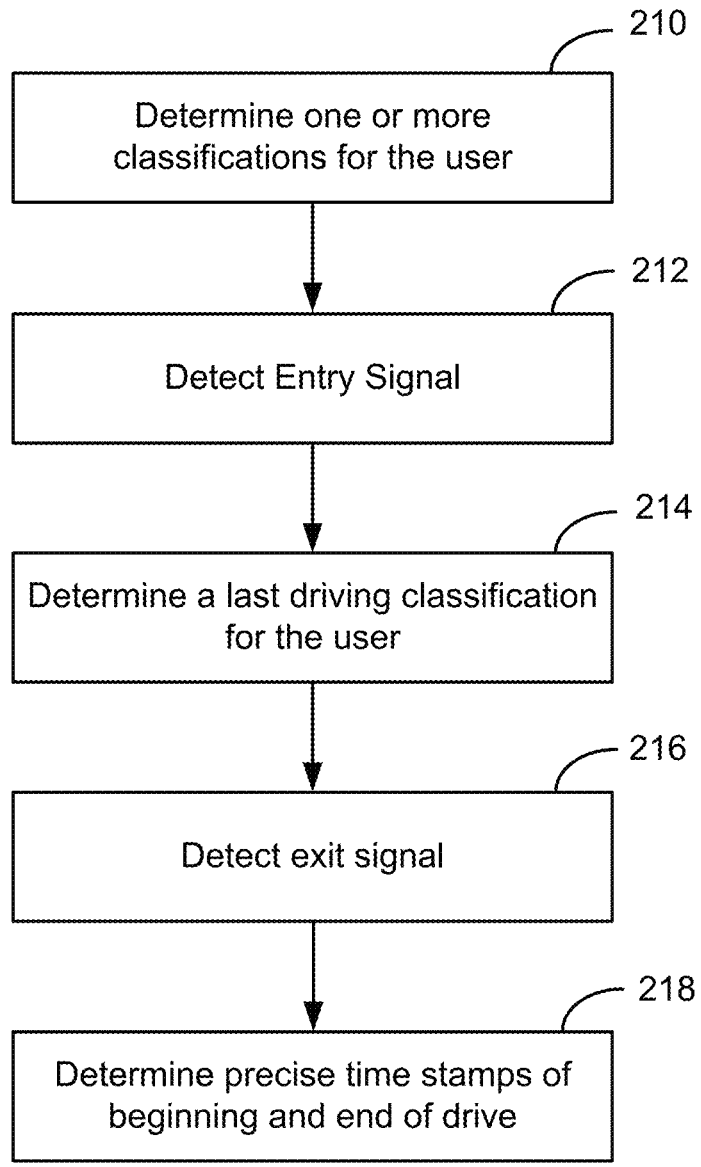
FIG. 2 is a simplified flowchart illustrating a method of determining times during which a user is driving a vehicle according to an embodiment of the present invention.

FIG. 2 is a simplified flowchart illustrating a method of determining times during which a user is driving a vehicle according to an embodiment of the present invention. Referring to FIG. 2, the method includes determining one or more classifications for the user (210). These classifications include walking, driving, stationary, and other, as described more fully in relation to FIG. 3.

Figure 3:
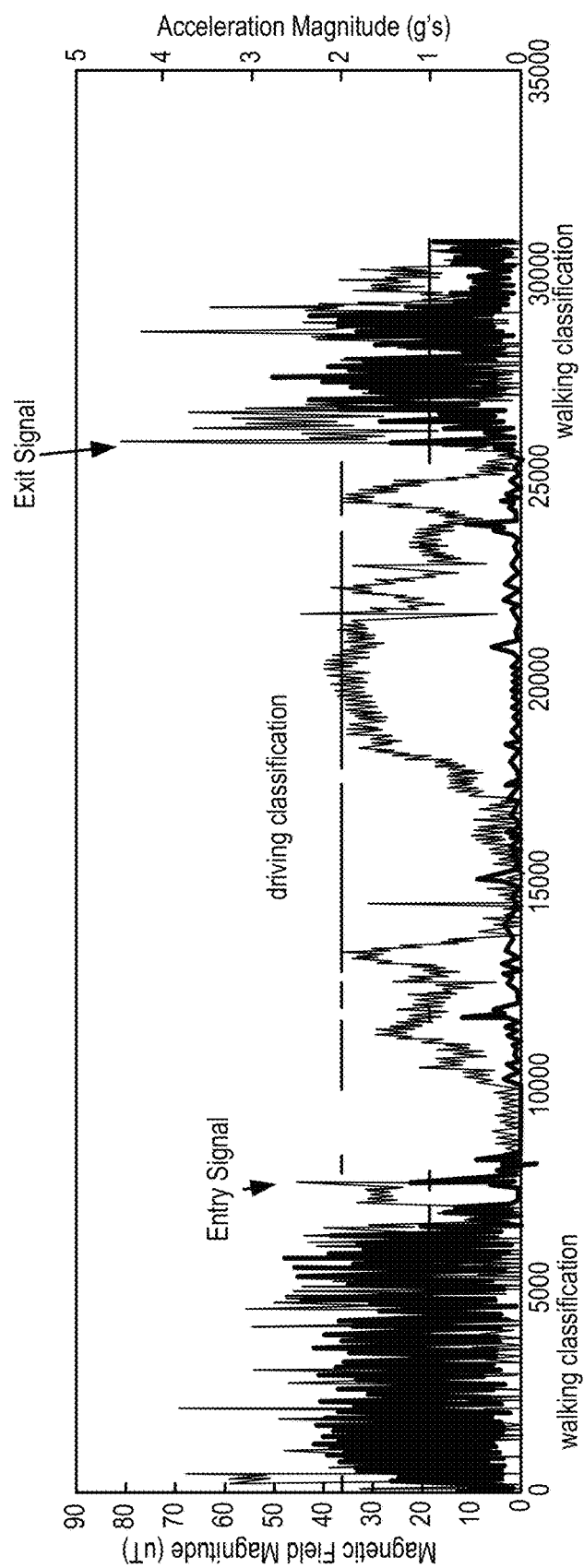
FIG. 3 is a simplified plot illustrating accelerometer magnitude and magnetic field magnitude as a function of time for walking, driving, and walking events according to an embodiment of the present invention.

FIG. 3 is a simplified plot illustrating accelerometer magnitude and magnetic field magnitude as a function of time for walking, driving, and walking events according to an embodiment of the present invention. As illustrated in FIG. 3, methods and systems according to the present invention enable the determination if a user is in one of three states: "walking," "other," or "driving." Thus, references to users as drivers herein is not intended to limit the user to the state of "driver," but is intended to connote a more general classification of the user, who may be in the driving state as a driver, but may also be in other non-driving states such as walking and other.

Referring to FIG. 3, embodiments classify driving events using entry/exit signals. We classify accelerometer events into classes to transform a broad dataset into identifiable events used to extract the relevant information using our machine learning algorithms. As described herein, embodiments of the present invention analyze data from sensors (i.e., accelerometers) in smart phones or other mobile devices to determine if a user is in one of three states: walking, other, or driving (which may be referred to herein as "user states"). In some embodiments, the data is broken up into discrete intervals and analyzed using signal processing techniques in order to extract features characterizing the signal. From these features, a database of training data is built and a predictive model is provided using machine learning techniques.

For example, the data may be broken up into intervals to balance processing time associated with individual signals with obtaining enough information for the classification processes. Typically, the raw acceleration data is smoothed to reduce noise, but this is not required by embodiments of the present invention. The magnitude of the total acceleration is taken along three axes (i.e., $a_x$, $a_y$, and $a_z$) to create direction free data using the formula:

$$\|a\| = \mathrm{sqrt}(a_x^2 + a_y^2 + a_z^2)$$

Next, feature extraction is performed to characterize each signal interval. Various frequency filters and wavelet transforms can be used on each signal interval to clarify different features. Various statistical analysis can also be performed on the processed signals to extract features.

To build a model, data was collected using several smart phones, with phone sensor data, including time-stamped acceleration data, gyroscope data, magnetic field data, and position (e.g., GPS) data stored in a database. After breaking this data up into intervals as mentioned above, each interval is labeled in accordance with the corresponding user state. After processing, the model was built using this data set classifier using a supervised learning regression based classifier. This model was then applied to all future intervals of data that were collected, providing for classification, which may be referred to as automatic classification.

Figure 4:
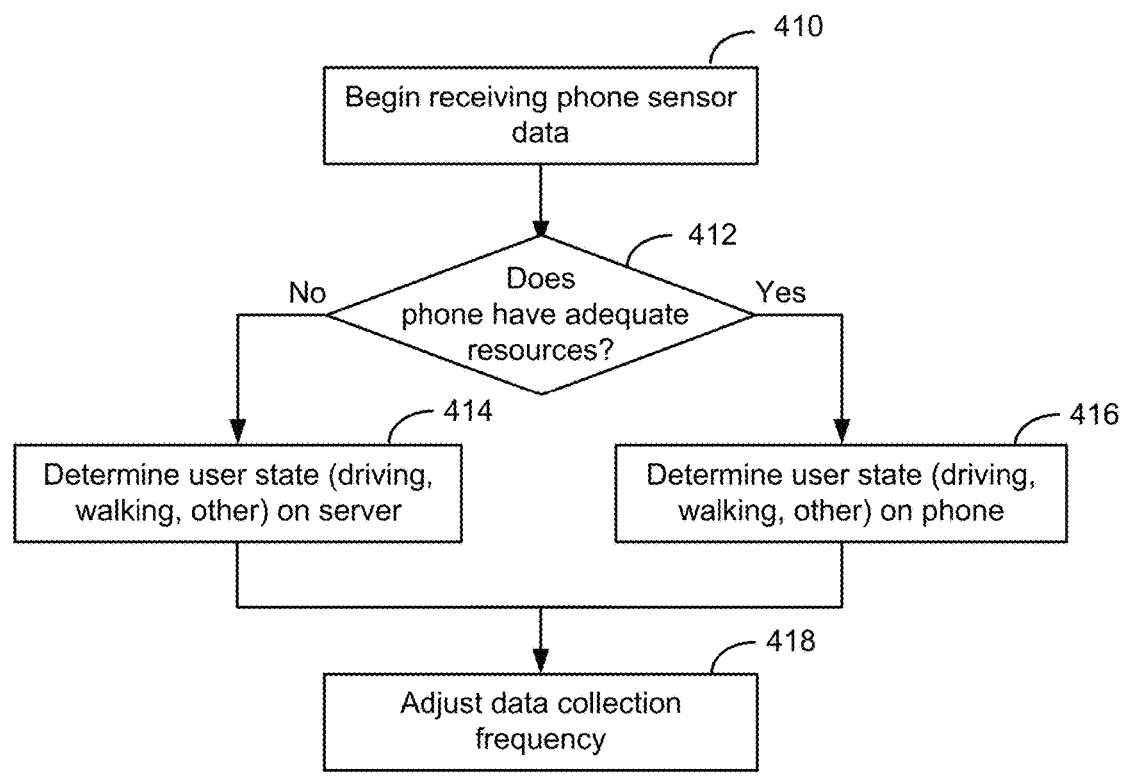
FIG. 4 is a simplified flowchart illustrating a method of adjusting data collection frequency according to an embodiment of the present invention.

In determining the first driving classification for the user (210), a data collection process is initiated. FIG. 4 is a simplified flowchart illustrating a method of adjusting data collection frequency according to an embodiment of the present invention. Referring to FIG. 4, the method includes beginning a process of receiving phone sensor data (410).

The method includes determining if the phone has adequate resources (412). As an example, when the phone's system resources increase, the application can check the phone's system resources to determine if they are sufficient for the continued operation of the application. If the phone does have adequate resources, data is sent to the server to determine the user state (e.g., driving, walking, or other) by which the results is sent back to the phone (416) as discussed in relation FIG. 2. In some embodiments, the driver can be in a state of "other," which is a state other than walking or driving (e.g. sitting at office desk), other includes any event that does not include walking, running, driving (driver or passenger) in an auto vehicle.

One or more processor, memories, or the like in the phone can be utilized to determine the user state. If the determination is made that the phone does not have adequate resources, for example, because the amount of battery life is not sufficient, then the determination of the state of the user is made on a server (414).

Thus, embodiments of the present invention are able to operate efficiently when battery power or other resources are constrained by determining whether or not immediate data analysis is appropriate in order for the application to function properly. The conditions for immediate data analysis can include if the application is determining the "walking", "driving", "other" classification, if the application is providing user feedback, or the like. If immediate analysis is appropriate, then data analysis can be done on the phone or be sent to the server for processing as appropriate.

Figure 21:
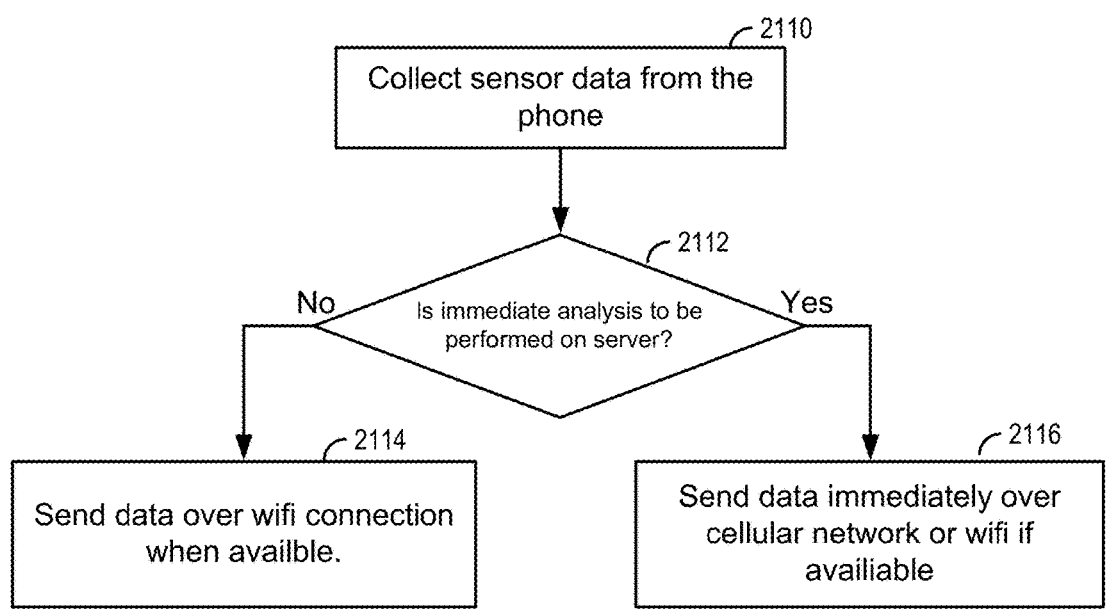
FIG. 21 is a simplified flowchart illustrating a method of determining conventions for sending data to the server for analysis according to an embodiment of the present invention.

FIG. 21 is a simplified flowchart illustrating a method of determining conventions for sending data to the server for analysis according to an embodiment of the present invention. Referring to FIG. 21, sensor data for the phone is collected (2110). A determination is made if immediate analysis is to be performed on a server (2112). If immediate analysis is to be performed on the server (i.e., immediate analysis is not appropriate for performing on the mobile device based on the mobile device resources), then the data can be sent using the cellular network or a wireless (e.g., wifi) connection when such connections are available (2116). If immediate analysis is not appropriate, then the data can be sent using a cellular connection, a wireless connection, a wired connection, or the like when such connections are available (2114). Thus, in an implementation, the system will store the data in local memory until there is a wifi or other suitable connection available if immediate data analysis is not appropriate. One of ordinary skill in the art would recognize many variations, modifications, and alternatives.

In some embodiments, when the application is turned on for the first time, the application begins running in the background. As an example, initially, the application and associated data collection can be run in a high power state to determine if the user is driving, walking, or in the other classification.

The method also includes adjusting the data collection frequency based on the driving, walking, or other classification (418). If the classification is "other," then the application collects data in a low frequency setting. If the classification is "walking," then the application collects data in a medium frequency setting so it does not miss the transition from "walking" to "driving." If the classification is "driving," then the application collects data in a high frequency setting so as to gain the appropriate amount of information to allow for risk modeling. Note that if a "other" classification is identified and it is a typical driving time (i.e., morning or evening commute) then the frequency can be increased from low to medium. Thus, factors other the classification can be utilized in setting the data collection frequency, including the time of day, the day of the week, the driver's previous history during a previous period, walking time, or the like. One of ordinary skill in the art would recognize many variations, modifications, and alternatives.

In one embodiment, the data collection frequency is adjusted based on a driving probability determined from Hidden Markov Models (HMM). The HMM are used to learn the driving patterns of individuals in order to determine when they are most likely to drive. This will allow data collection to be performed at medium and high frequency during the times when it is more likely that an individual will be driving.

It should be appreciated that the specific steps illustrated in FIG. 4 provide a particular method of adjusting data collection frequency according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 2, the method is able to determine the beginning and end of driving by determining the walking classifications, i.e., by classifying walking, other, and driving states. As illustrated in FIG. 3, the transition points between walking and driving can be determined to find the beginning and end of a drive (i.e., the driving classifications will be flanked by walking classifications). Thus, the method provides data on entry and exit windows. The method also includes detecting an entry signal (212). As illustrated in FIG. 3, the entry signal within the last walking classification before the driving state is found. In particular, the method determines the transition point between walking and driving by finding the last walking classification and the first driving classification before a drive. This allows for narrowing down of the window in which the entry signal is found. Once this window is defined, the method can determine if an individual is a driver as described in relation to FIG. 6.

Figure 5:
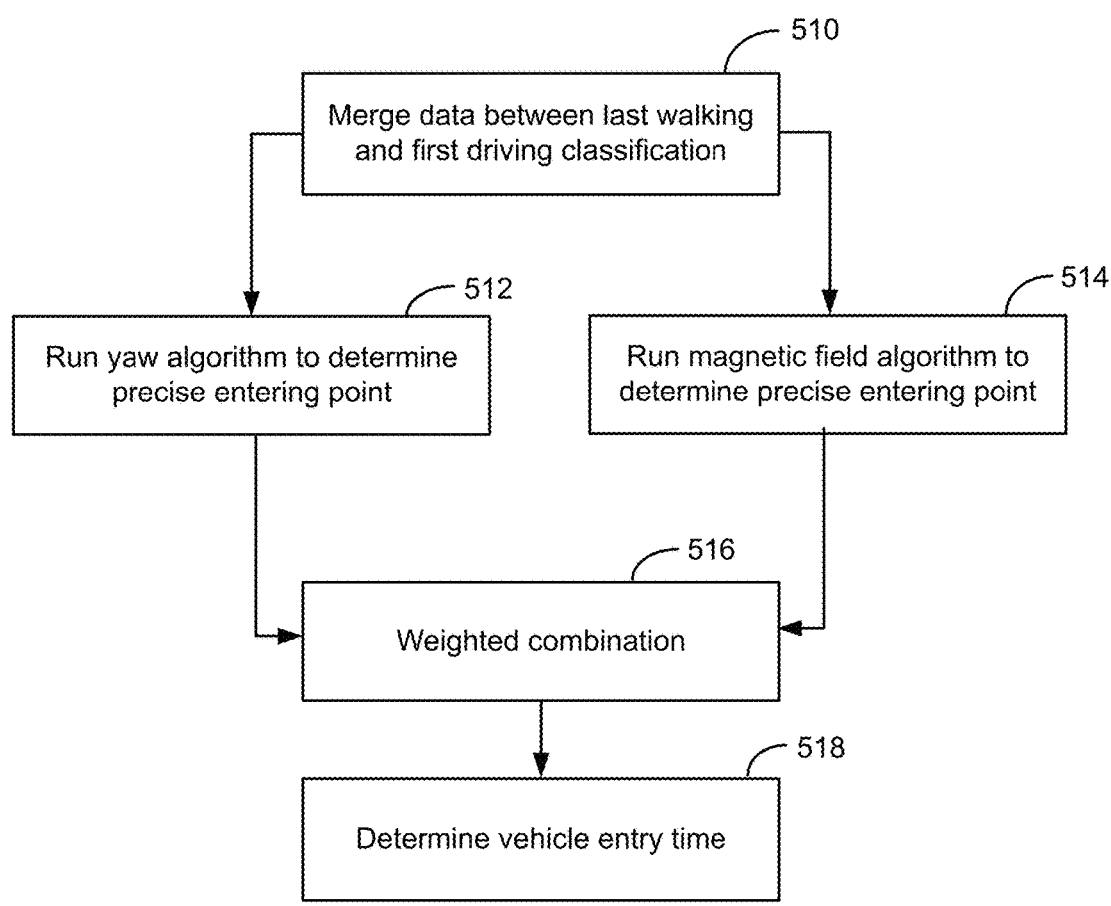
FIG. 5 is a simplified flowchart illustrating a method of improving window accuracy for entry detection according to an embodiment of the present invention.

As discussed above, narrowing down or increasing the accuracy with which the entry and exit windows are defined provides benefits including ease of computation. FIG. 5 is a simplified flowchart illustrating a method of improving window accuracy for entry detection according to an embodiment of the present invention. The method includes merging the last walking window and the first driving window in a set of data (510). After detecting the appropriate windows for the abutting walking and driving signals at the beginning and end of a drive as described in relation to FIG. 2 as described in relation to elements 212 and 216, these windows are merged together to form a merged entry window and a merged exit window. The method also includes running a yaw algorithm to detect an entering point (512). Using the merged windows produced in element 510, the yaw algorithms are run to determine the exact point of entry and exit. When someone enters or exits a vehicle, their body turns at least 45 degrees (and often up to 90 degrees). Accordingly, the gyroscopes on the phone are used to identify this yaw angle change, which allows the method to narrow the entry window even more precisely.

Figure 20:
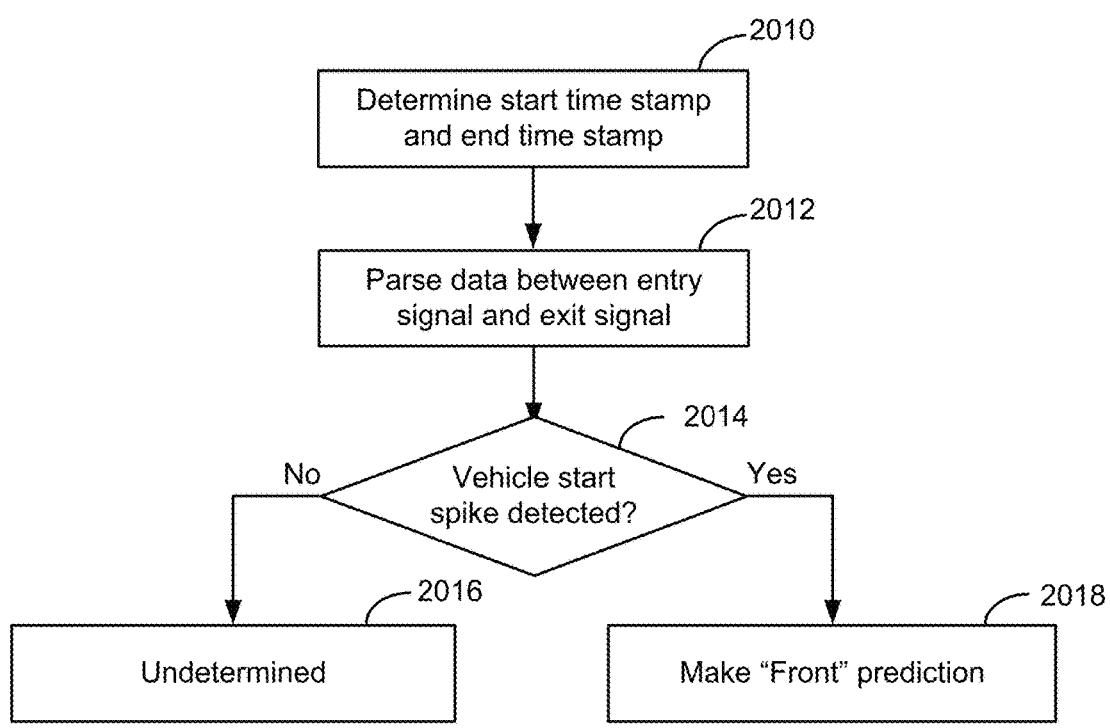
FIG. 20 is a simplified flowchart illustrating a method of determining if a user is located in the front or back of a vehicle according to an embodiment of the present invention.

In addition to or in place of the use of the yaw algorithm, the method can include running a magnetic field algorithm as described in relation to FIG. 20 to find entering point (514). Thus, in addition to the yaw algorithm, a magnetic field algorithm can be used to find more precise entry points within the merged windows produced in element 510. The vehicle acts as a Faraday cage and causes identifiable fluctuations/spikes in the magnetic field that are discernible using sensors integrated with the phone. These fluctuations/spikes in magnetic field happen as the user is entering the vehicle, which can then be used to identify more precise entry points.

Although the discussion above in relation to FIG. 5 relates to improving the accuracy associated with the window for the entry point, these techniques are also applicable to improving the accuracy associated with the window for the exit point. In addition, as applicable throughout the specification, methods discussed in relation to entry signals are also applicable to exit signals as appropriate. It should be noted that when applying the techniques discussed in relation to entry signals to exit signals, the acceleration values are reversed. If both 512 and 514 do not yield an undetermined result, a normalized weighted sum of the calculated probabilities, that the entry point happened at a particular point in time, is computed and a final probability is outputted that is used to give a best estimate of the exact time of entry into the vehicle. If either 512 or 514 yield an undetermined result the prediction is made solely on the determined result. If both are undetermined then the prediction is undetermined.

Referring once again to FIG. 2, at the completion of the driving event, the last driving classification for the user is determined (214). In this method, an exit signal within the first walking classification after the driving event is detected (216). Referring to FIG. 3, the transition point between driving and walking can be found by determining the last driving classification and the first walking classification after a driving event. This transition point can be used to narrow down the window in which the exit signal is detected as discussed in relation determining more precise entry points in FIG. 5 since the discussion in FIG. 5, as well as other suitable figures throughout the specification, is applicable to both entry and exit signal determination and precision improvements. Given the entry signal and the exit signal, the method can determine the precise time stamps of the beginning and the ending of the driving event (218). Once we find this window we can determine if an individual is a driver as described in relation to FIG. 6.

By using the methods and systems described herein, driver classification as a function of time is provided as an output. This driver classification as a function of time provides information on the state of the driver, including information on when they entered the vehicle, when driving events occurred, when they exited the vehicle, and the like. Thus, during a period of time such as a day, the driver classification can include time stamps for entering and exiting the driver's vehicle or vehicles driven by other people (as a passenger), driving time and time periods, stationary time in a vehicle, and the like. Accordingly, embodiments of the present invention provide data on whether a user is a driver or a passenger during the driving time.

Figure 6:
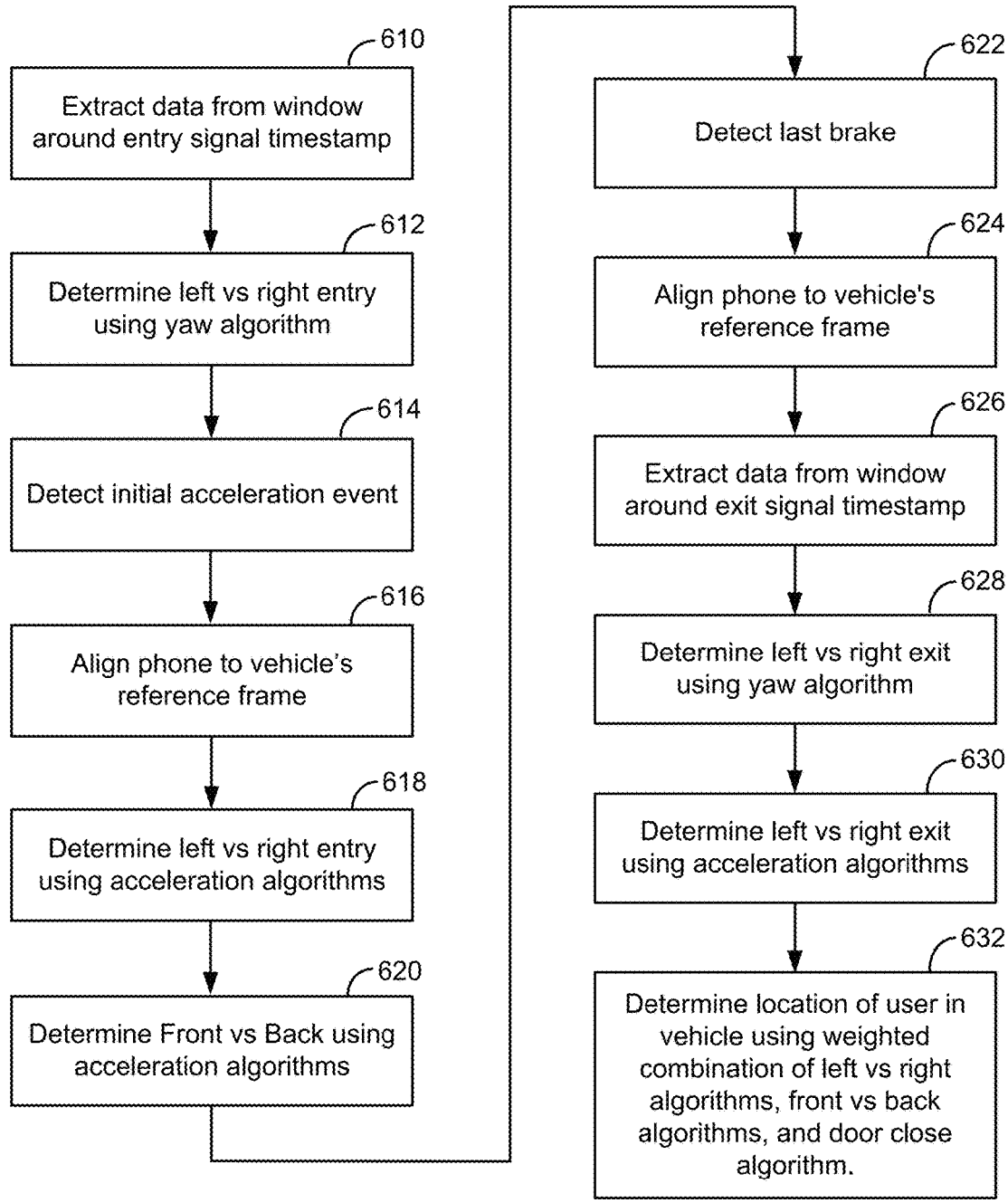
FIG. 6 is a simplified flowchart illustrating a method of determining a location of a user/phone in a vehicle according to an embodiment of the present invention.

As described in relation to FIG. 6 (e.g., 612, 618, 620, 628, and 630), the system can predict either a probability (a real number between 0 and 1) or an "undetermined" prediction. After the method illustrated in FIG. 6, the outputs of an "undetermined" prediction can be ignored and a weighted combination of the probability outputs can be considered to output the final prediction that represents whether or not the user is in the driver's seat or not.

If the method outputs a predetermined probability that satisfies the requirements of the application (e.g., 90% probability) the processes described in relation to FIG. 6 are stopped and the final prediction that represents whether or not the user is in the driver's seat or not is taken solely off the prediction that was the first prediction over the required probability threshold.

It should be appreciated that the specific steps illustrated in FIG. 2 provide a particular method of determining times during which a user is driving a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 is a simplified flowchart illustrating a method of determining a location of a user/phone in a vehicle according to an embodiment of the present invention. The method illustrated in FIG. 6 provides a direct method of determining where a user and/or a user's phone is located in a vehicle and if the user is driving the vehicle during a driving event. The method includes extracting data from the window around the entry signal time stamp (610). (See the discussion related to FIG. 5). It should be noted that the methods described in relation to FIG. 6 utilize information related to the entry of the user into the vehicle as described herein. When an individual enters and exits a vehicle, their body turns at least some minimum angle threshold (e.g., 40 degrees) about the z-axis (the z axis, is aligned with gravity, and the yaw is defined as the angular distance in a counter-clockwise direction around the z-axis). After merging the windows form the last walking and first driving classification (see 510), we can look in this merged window for the exact time when a user turns about the z axis at least some minimum threshold angle. This allows us to narrow down the window to the exact point of entry.

In order to determine if the user entered the vehicle from the left or right, several algorithms can be used in conjunction with each other or separately. As an example, after identifying a precise time window of when the user has entered the vehicle as described in relation to FIG. 5 above, the user is identified as being on the left or the right side of the vehicle. This is determined using one, multiple, or all of the methods described below.

As illustrated in FIG. 6, the method runs a left vs. right enter yaw algorithm to determine if the driver entered from the left or the right side of the vehicle (612). Additional description related to the use of the yaw algorithm to determine driver entry side is provided in relation to FIG. 7 below. As driving begins, the method detects an initial (e.g., the first) acceleration event (614). Although a first acceleration event is detected in some embodiments, other implementations will utilize an acceleration event early in the driving event, although not the first acceleration event. Additional description related to the detection of the initial acceleration event, which can be either an acceleration or a braking event is provided in relation to FIG. 9B.

Given the detection of the initial acceleration event, the method also includes aligning the phone to the vehicle's (e.g., a car's) reference frame (616). Additional description related to the detection of the initial acceleration event is provided in relation to FIG. 9A.

Given the alignment of the phone to the reference frame of the vehicle, the method can utilize an acceleration-based algorithm to determine if the driver entered on the left or right side of the vehicle (618). Additional description related to the acceleration-based left vs. right algorithm is provided in relation to FIG. 11 below.

The method further includes determining if the user is in the front or back of the vehicle (620). One of multiple methods is utilized to determine if the user is in the front or back of the vehicle, including one or more of the methods described in relation to FIGS. 16 and 18.

Referring once again to FIG. 6, the method includes determining the user's exit from the vehicle. This includes detecting a terminal acceleration (i.e., a braking event) near or at the end of the driving event (622). In some implementations, the last braking event in the driving event is determined. Referring to FIG. 3, as the driving event ends, a window can be created around the user's exit from the vehicle, with the window based on or including the end of the driving classification and the first walking classification after the driving event. The last braking event will be in this window.

After driving of the vehicle, the alignment between the phone and the vehicle's reference frame can change. Accordingly the phone is aligned to the vehicle's reference frame after the last braking event is detected (624) and data is extracted from the window around the exit signal timestamp (626). Additional description related to the alignment of the phone to the vehicle's reference frame is provided in relation to FIG. 9A below. Additional description related to the definition of the exit window is provided in relation to FIGS. 2 and 5 below.

Figure 11:
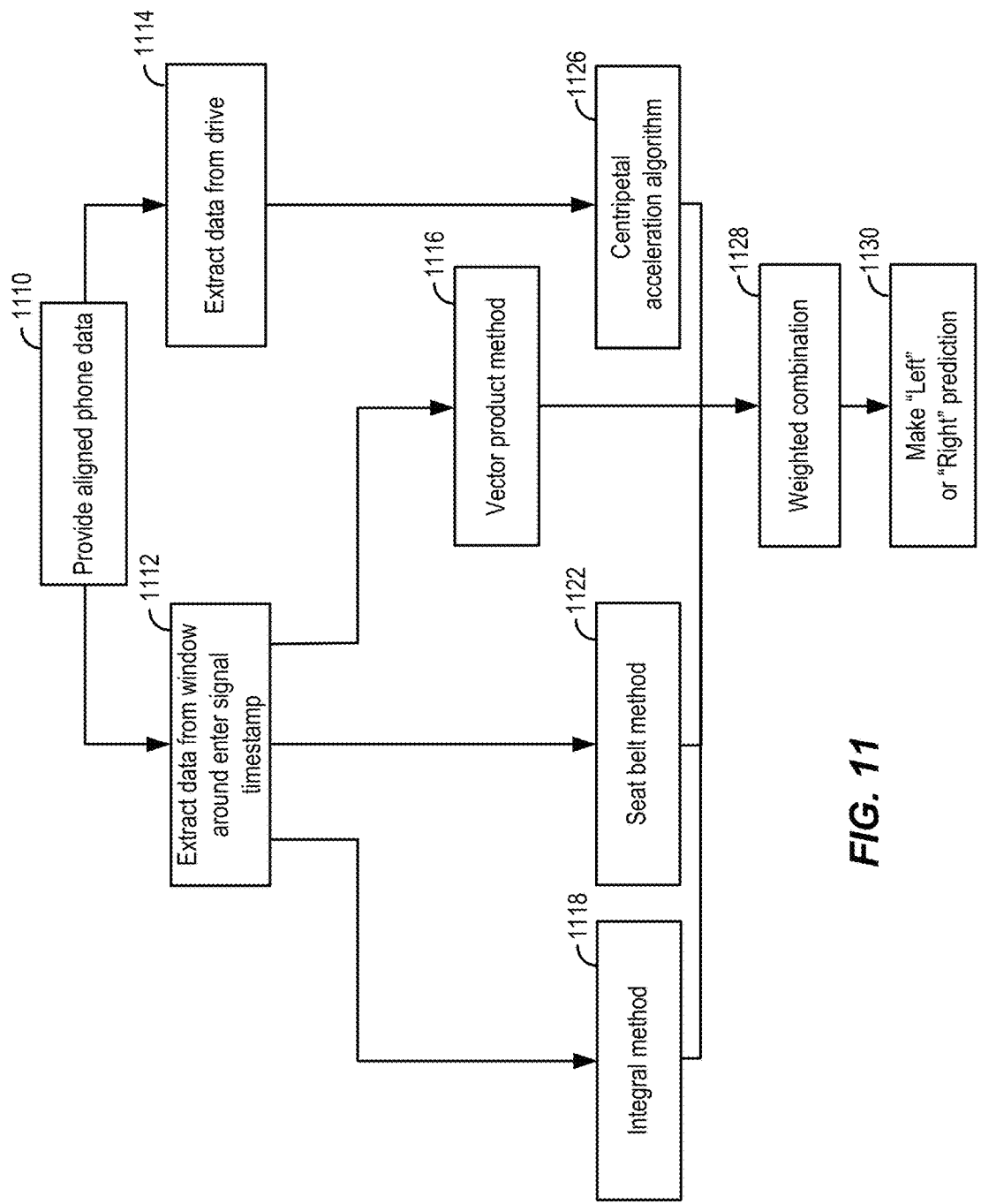
FIG. 11 is a simplified flowchart illustrating various acceleration-based methods of determining if a user entered a vehicle on the left or right side according to an embodiment of the present invention.

In order to determine which side of the vehicle a user exited or was located during the driving event, one or more left vs. right exit algorithms can be utilized (630), including a yaw-based algorithm as described in relation to FIG. 7 or acceleration-based algorithms as described in relation to FIG. 11. In some embodiments, a weighted average of the left vs. right algorithms is computed, which is then used to determine the left vs. right and front vs. back location of the user/phone in the vehicle (632).

It should be appreciated that the specific steps illustrated in FIG. 6 provide a particular method of determining a location of a driver in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7A:
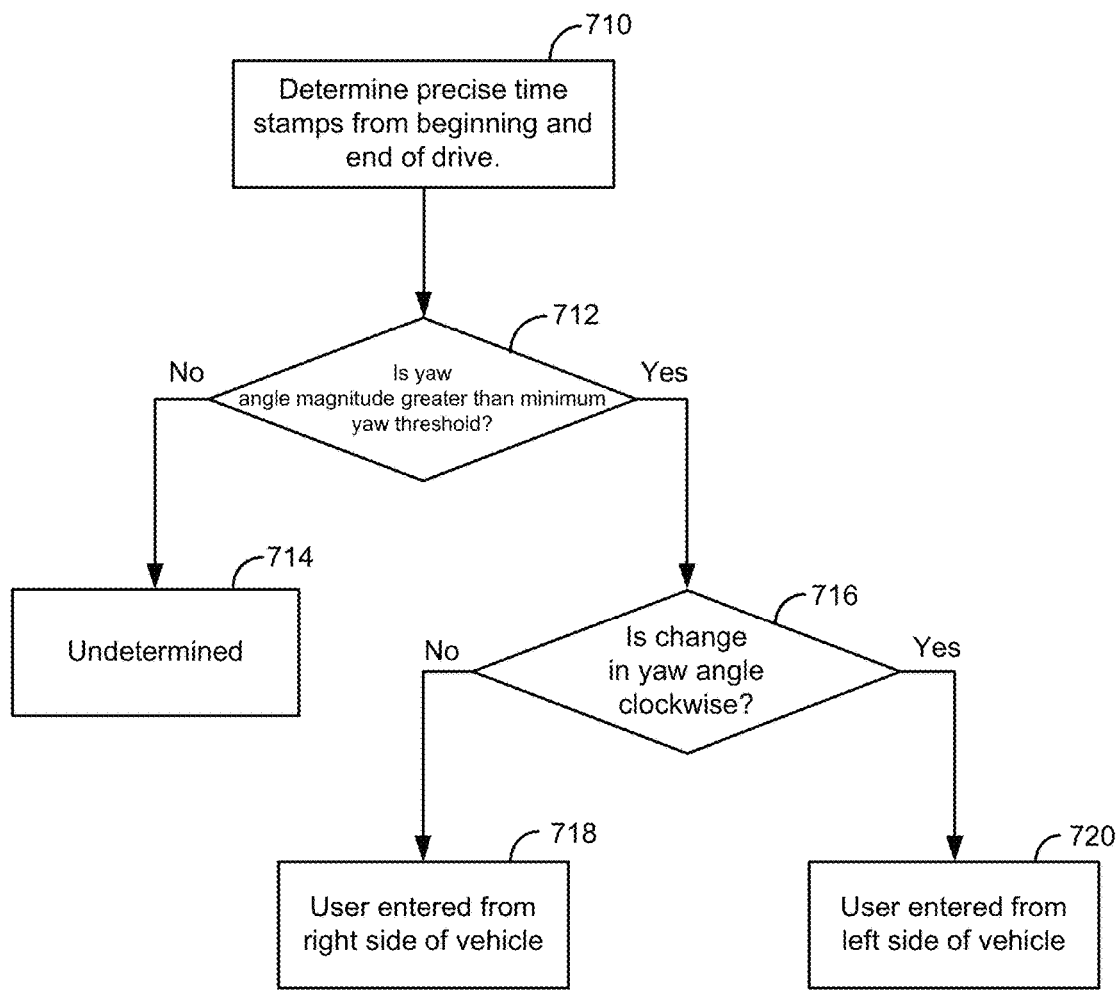
FIG. 7A is a simplified flowchart illustrating a method of determining if a user entered from the left or right side of a vehicle according to an embodiment of the present invention

FIG. 7A is a simplified flowchart illustrating a method of determining if a user entered from the left or right side of a vehicle according to an embodiment of the present invention. The method illustrated in FIG. 7A utilizes yaw detection as described below. In particular, the yaw angle of the phone is used as a unique identifier to determine if the user entered the car on the left or right side of the car. Using a reference frame in which the z-axis of the phone is oriented directly opposite of the acceleration due to the earth's gravity, the angle of rotation around the z-axis is analyzed as yaw. First determining the enter window, which represents the time span of the physical event of a user entering a car, the data over the entry window is partitioned into possibly overlapping sub-windows. The length of the sub-windows starts at a relatively large size (e.g., 1 second in length) whereby the yaw data contained within each window is analyzed to detect a yaw value that is greater than a predetermined threshold over a predetermined time. The algorithms used to detect this yaw value may include Dynamic Time Warping, to detect signal patterns that are invariant of time and speed, peak detection algorithms (e.g. wavelet, FFT, calculus optimization), and simple statistical thresholds.

Once this yaw value, corresponding to the user entering the car is detected, the change in yaw over this period is analyzed. If the user enters the car from the passenger's side, there is a unique counter clockwise rotation in this yaw axis due to the nature of the movement involved in entering the car. There will be a similar motion on the driver's side of the car on entry (and exit), but with a reversed sign to that of the passenger's side. A user typically turns at least 45 degrees when entering the car, so if a yaw angle change of approximately this magnitude is detected in the precise window identified in the relation to the method discussed in FIG. 5, then it is possible to tell on which side of the vehicle a user entered.

Figure 7B:
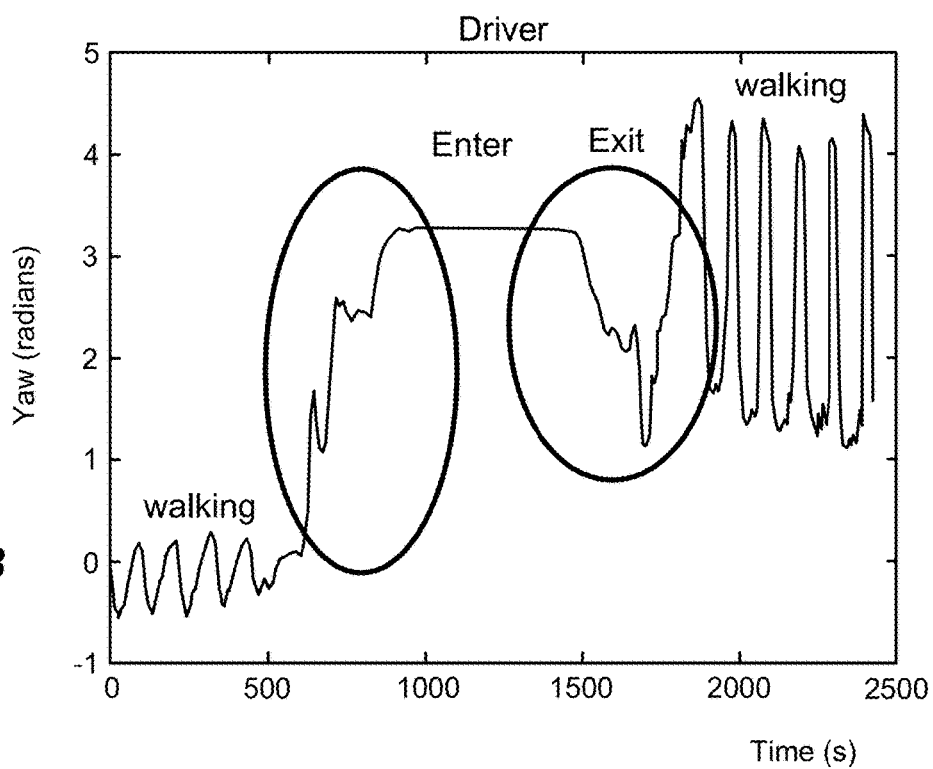
FIG. 7B is a simplified plot of yaw data as a function of time for a driver entering a vehicle according to an embodiment of the present invention.
Figure 7C:
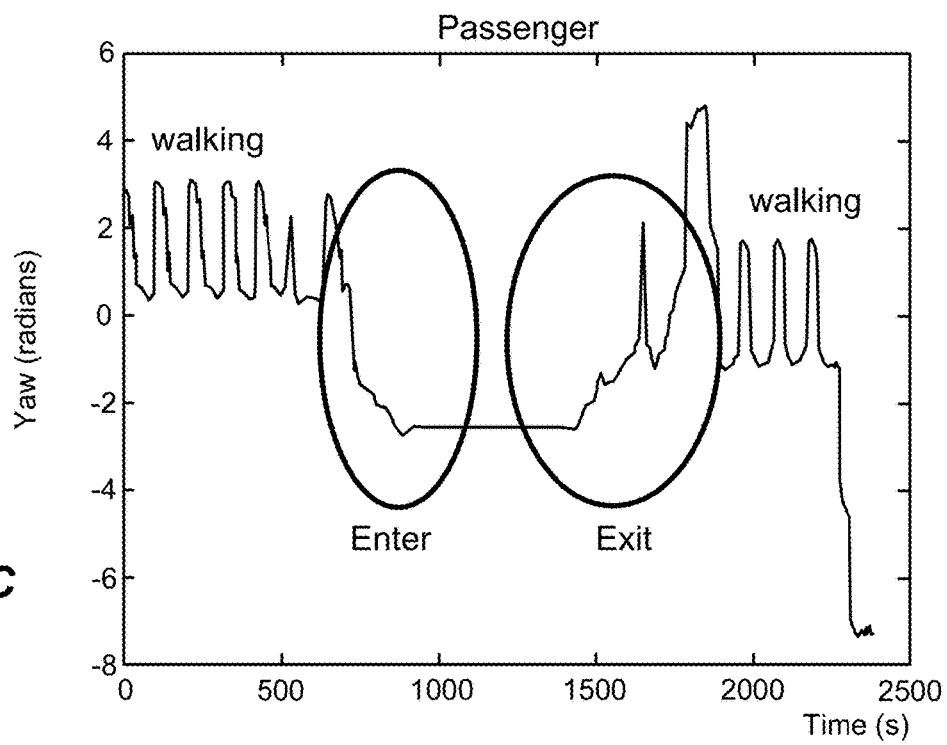
FIG. 7C is a simplified plot of yaw data as a function of time for a passenger entering a vehicle according to an embodiment of the present invention.

FIG. 7B is a simplified plot of yaw data as a function of time for a driver entering a vehicle according to an embodiment of the present invention. FIG. 7C is a simplified plot of yaw data as a function of time for a passenger entering a vehicle according to an embodiment of the present invention. As illustrated in FIG. 7B, after the transition from the walking event, the yaw angle increases during entry, stabilizes during driving, and decreases on exit. In contrast, as illustrated in FIG. 7C, for a passenger, the yaw angle decreases during entry, stabilizes during driving, and increases on exit. Therefore, by measuring the yaw angle in a reference frame oriented opposite to that of gravity and detecting the unique down-up-down pattern for the driver and the unique up-down-up pattern for the passenger, it is possible to determine if the user entered the vehicle from the left or right side of the vehicle.

It should be appreciated that the specific steps illustrated in FIG. 7A provide a particular method of determining if a user entered from the left or right side of a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives.

The phone is equipped with a three-axis accelerometer. Each axis of the phone's accelerometer measures a component of the total acceleration that is projected onto each axis. We define the phone's z-axis to be in a direction that is aligned to the vector defined by the acceleration due to gravity. We define the x-y plane to be the plane perpendicular to the z-axis. The x-axis is defined arbitrarily along the x-y plane, when the phone application is first started, and maintains this direction until the application is terminated. The y-axis is defined so that it's both perpendicular to the z-axis and the x-axis, so that the vector cross product of the unit vectors that describe the axes, cross(x,y), is equal to the z. For example, in the left vs. right methods, when the x-axis is aligned to the transverse direction of the car and the y-axis is aligned to the longitudinal direction of the car, by taking the integral of the acceleration along the x-axis, over the time the user entered the car, it can be determined whether the user entered from the left or right side of the car.

The phone is also equipped with a three-axis gyroscope that measures the angular rotation the phone undergoes around the x-axis, y-axis, and z-axis. We call the roll the angular rotation around the x-axis, the pitch the angular rotation around the y-axis, and yaw the angular rotation about the z-axis. A positive increase of rotation is defined in the counter-clockwise rotation about the x-axis, y-axis, or z-axis. For example, in the yaw-based methods discussed herein, data from the gyroscope is used in some embodiments to detect the rotation typical of a user entering and exiting a car.

The longitudinal direction of the car is defined as the direction defined by the vector travelling through the back of the car and the front of the car (i.e. through the front and back windows). The transverse direction of the car is defined by the vector pointing through the left and right of the car (i.e. through the passenger and driver windows). The z-axis of the car is the direction along the vector defined by the acceleration due to gravity.

Figure 8A:
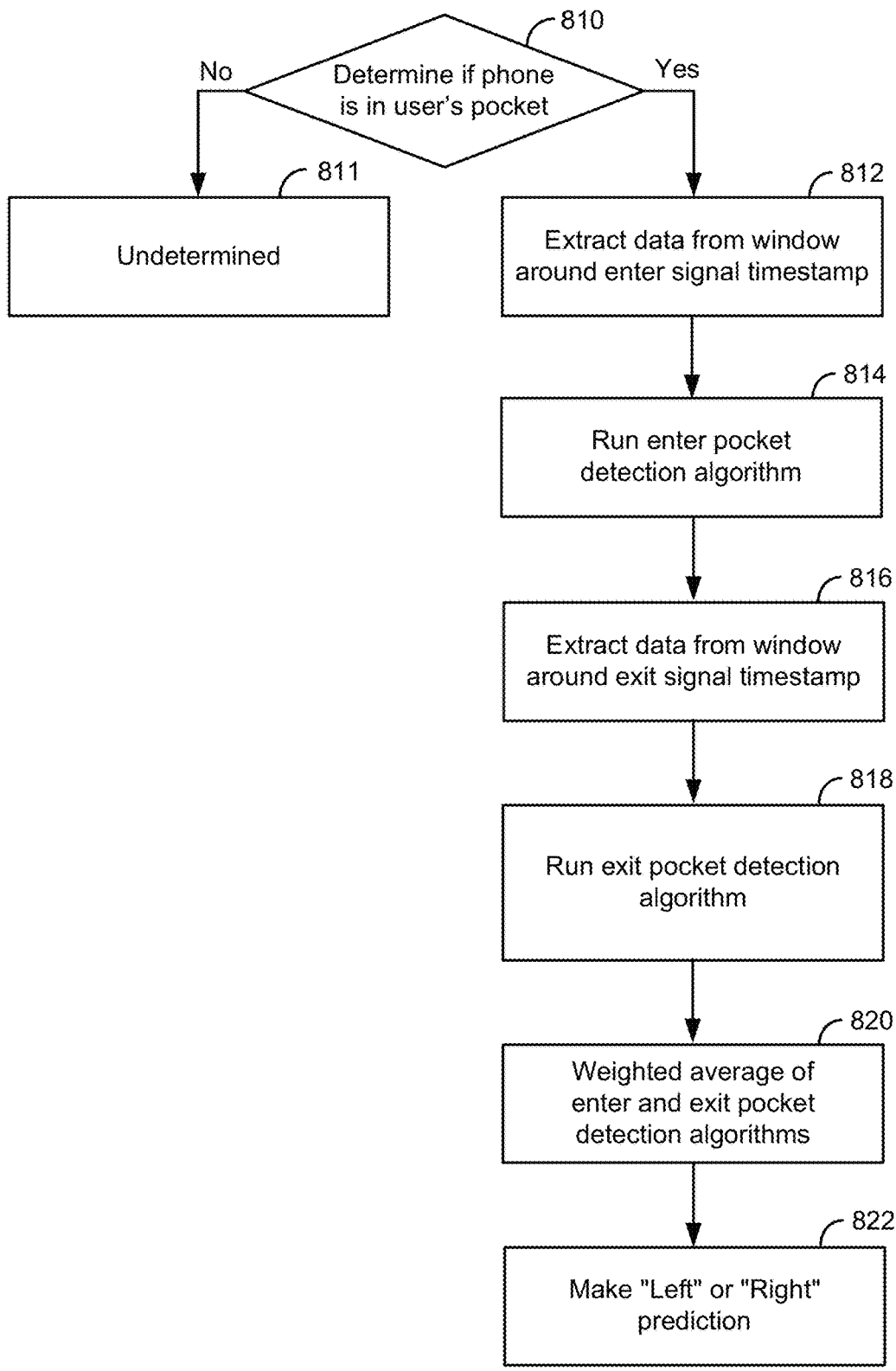
FIG. 8A is a simplified flowchart illustrating a method of determining if a user entered from the left or right side of a vehicle according to an alternative embodiment of the present invention.

FIG. 8A is a simplified flowchart illustrating a method of determining if a user entered from the left or right side of a vehicle according to an alternative embodiment of the present invention. The method includes determining if a phone is in a user's pocket (810). Collecting labeled data from two classes: data corresponding to events whereby the phone is located on the person, and events whereby the phone is not located on the person, extracting meaningful parameters from this data that distinguishes the two classes and are consistent among data that is the same class (e.g. statistical metrics, wavelet parameters, FFT coefficients) a classifier (e.g. support vector machine, neural network, random forest) can be developed to predict if in future events the phone is located on a person or not. With further analysis and with the use of more specifically label training data the same procedure can be used to make a prediction which of the following locations the phone is located at a particular time: trouser pocket, upper pocket, hand, bag. Another method to determine if the phone is in the pocket is to directly run 812-816 and if the result is not undetermined, then it is known that the phone is in an upper pocket. In some cases, the method may be undetermined (811).

Figures 1, 8B:
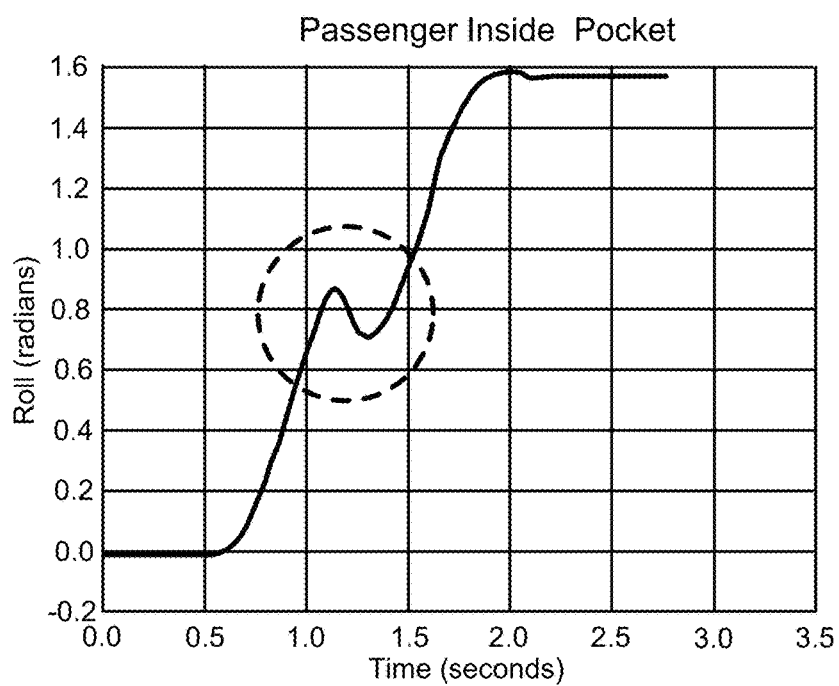
Figures 2, 8B:
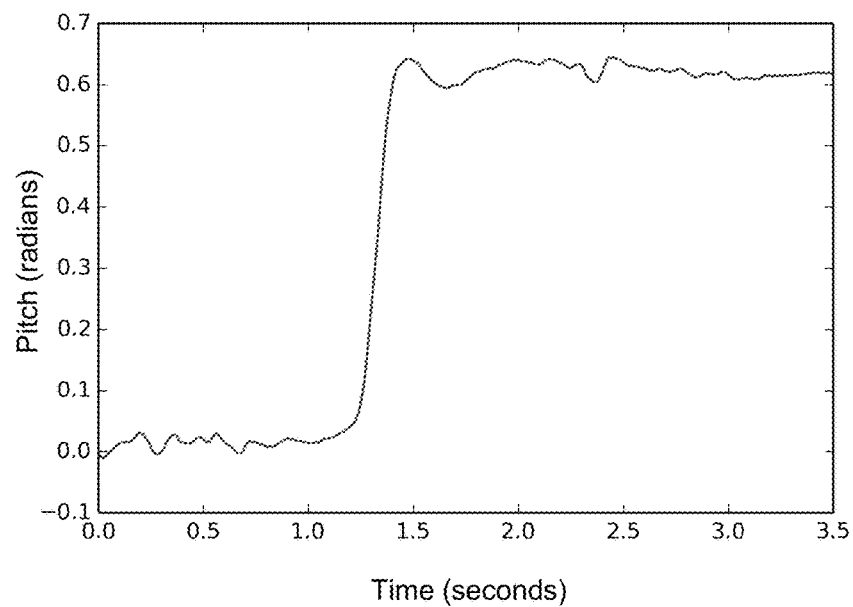

Data is extracted from the window around the enter signal time stamp (812). This data is analyzed to by running an enter pocket detection algorithm (814), providing data when the phone is in the user's pants pocket. The enter pocket detection algorithm looks for signature behavior—when people enter a car they predictably lift their inner leg, get into the car, and then bring in their outer leg. Thus, embodiments utilize an algorithm that detects two signatures: one signature is seen in the roll data taken by the gyroscope as discussed in relation to FIGS. 8B-1-8E-1. From this data it is possible to determine whether the phone is in the user's inner pocket or their outer pocket. The second signature shows up in the gyroscope's pitch data as illustrated in FIG. 8B-2-8E-2. In particular, when the phone is in the left pocket, the pitch signal transitions from a low state to a high state. When the phone is in the right pocket, the pitch signal transitions from a high to low state. This information can be coupled with the roll signal to enable a unique determination of which door and in which pants pocket the phone was located when the user entered the vehicle.

FIG. 8B-1 is a simplified plot of roll as a function of time for a passenger entering a vehicle with a phone in an inside pocket according to an embodiment of the present invention. As illustrated in FIG. 8B-1, if the phone is in the passenger's inside pocket, the roll value increases during entry, with a blip in the roll value near the center of the entry process, which occurs from about 0.5 seconds to about 2.0 seconds in this example. The blip at about 1.1 seconds is characteristic of the passenger having the phone in their inside pocket as they enter the vehicle.

FIG. 8B-2 is a simplified plot of pitch as a function of time for a passenger entering a vehicle with a phone in an inside pocket according to an embodiment of the present invention. The pitch of the phone goes from a relatively low value to high value, due to the nature of how a user rocks their weight while entering the car from the right side, which their phone in the inner pocket.

Figures 1, 8C:
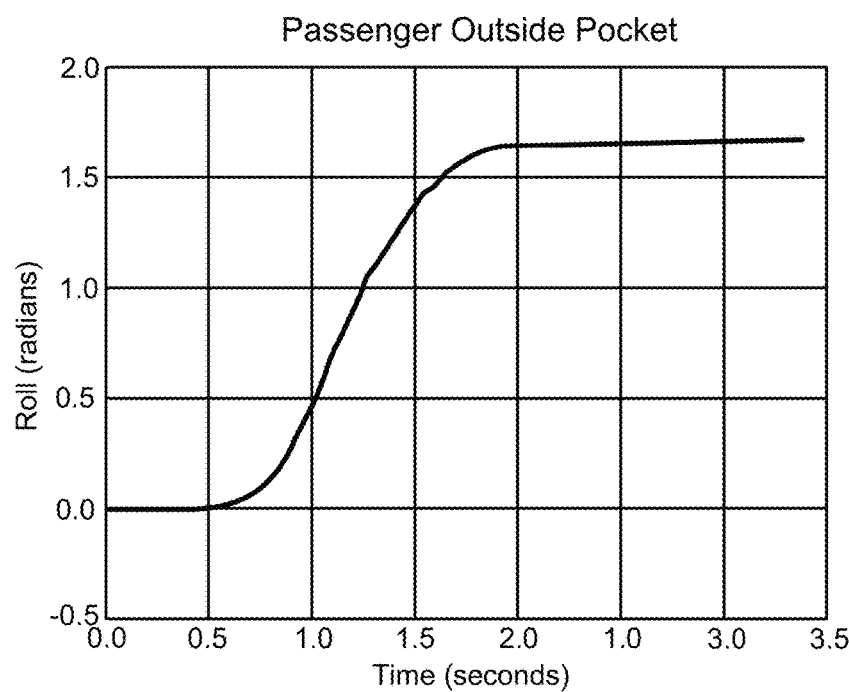
Figures 2, 8C:
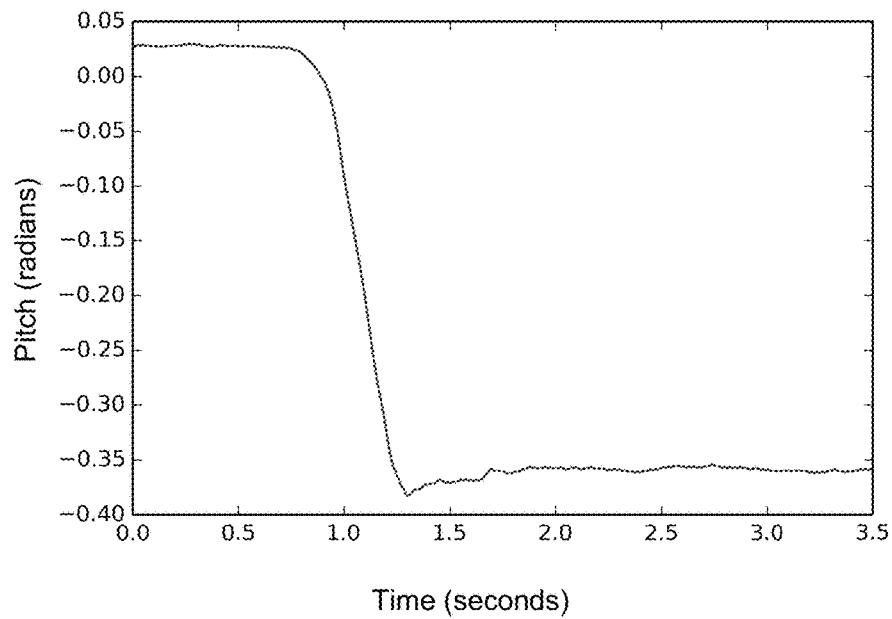

FIG. 8C-1 is a simplified plot of roll as a function of time for a passenger entering a vehicle with a phone in an outside pocket according to an embodiment of the present invention. As illustrated in FIG. 8C-1, if the phone is in the passenger's outside pocket, there is a continuous increase in the roll value as the passenger enters the vehicle. This roll value increase occurs because of the nature user's put their phone in their pockets (e.g. with the long side of the phone along the length of the pocket). This continuous increase in roll value is associated with the passenger having the phone in their outside pocket as the passenger enters the vehicle.

FIG. 8C-2 is a simplified plot of pitch as a function of time for a passenger entering a vehicle with a phone in an outside pocket according to an embodiment of the present invention. The pitch of the phone goes from a relatively high value to a relatively low value, due to the nature of how a user rocks their weight while entering the car from the right side, which their phone in the outer pocket.

Figures 1, 8D:
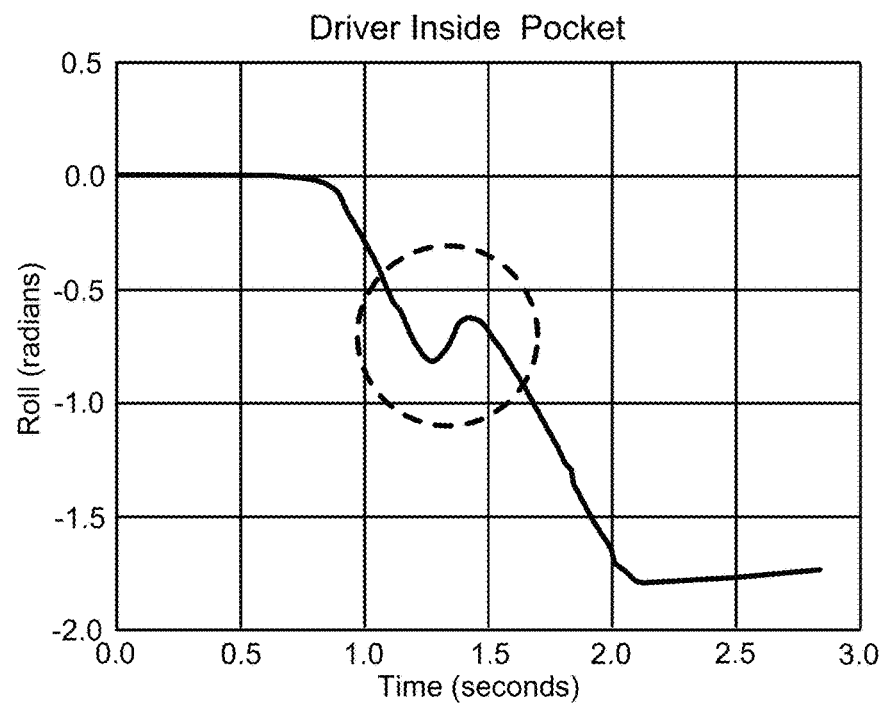
Figures 2, 8D:
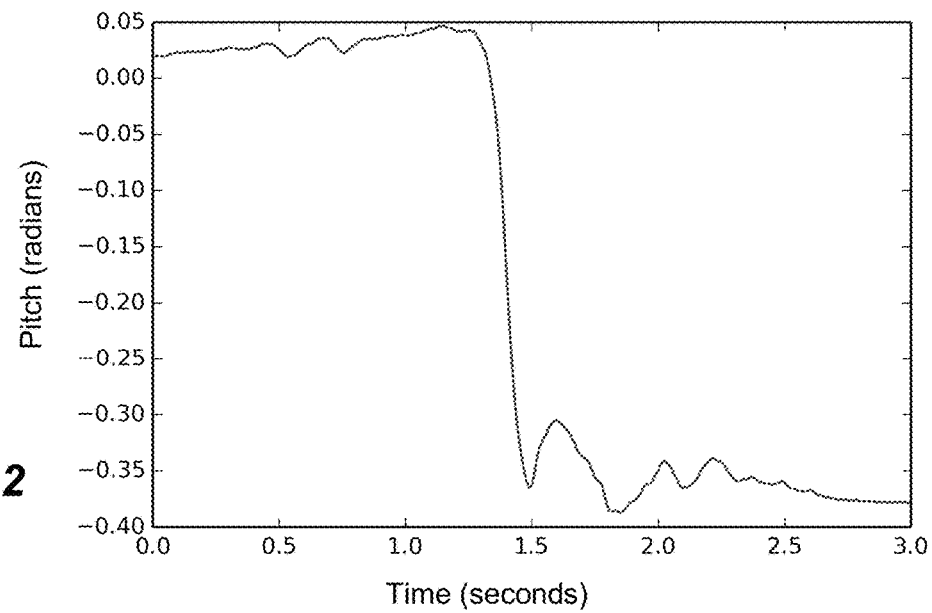
Figures 1, 8E:
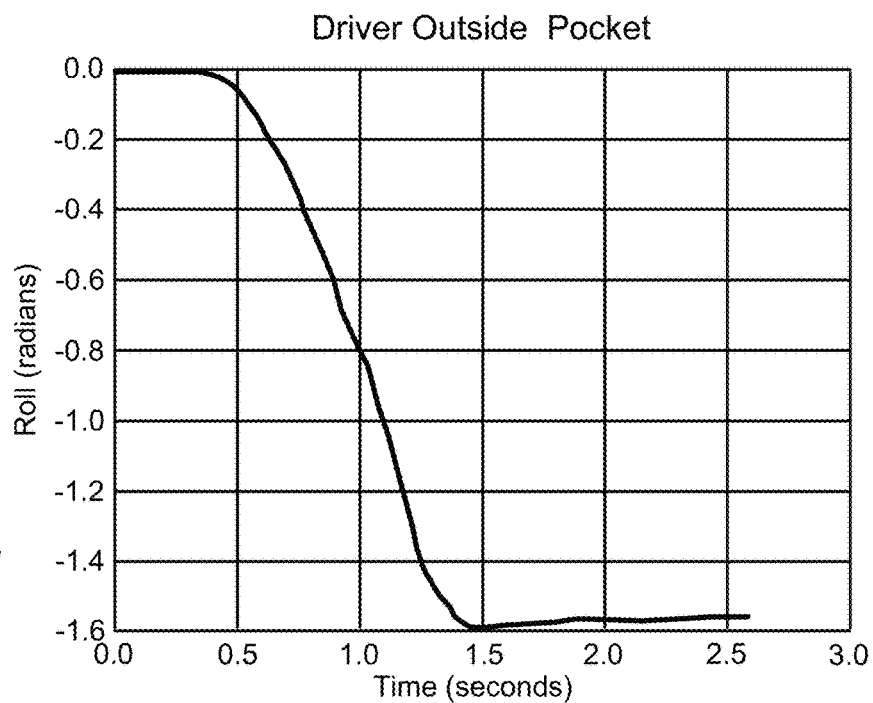
Figures 2, 8E:
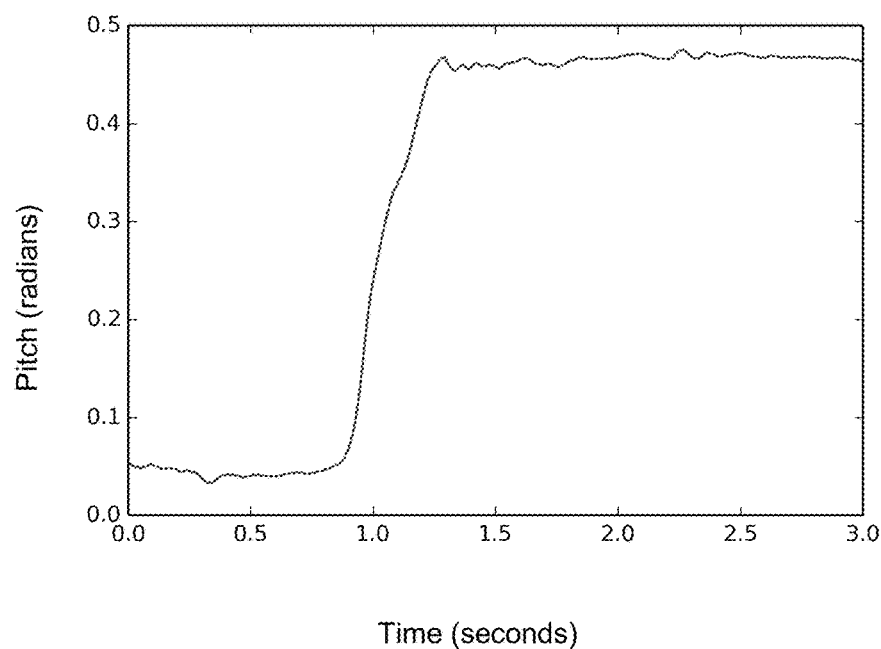

FIG. 8D-1 is a simplified plot of roll as a function of time for a driver entering a vehicle with a phone in an inside pocket according to an embodiment of the present invention. As illustrated in FIG. 8D-1, if the phone is in the driver's inside pocket, the roll value increases during entry, with a blip in the roll value near the center of the entry process, which occurs from about 0.5 seconds to about 2.0 seconds in this example. The blip at about 1.1 seconds is characteristic of the driver having the phone in their inside pocket as they enter the vehicle.

FIG. 8D-2 is a simplified plot of pitch as a function of time for a driver entering a vehicle with a phone in an inside pocket according to an embodiment of the present invention. The pitch of the phone goes from a relatively high value to relatively low value, due to the nature of how a user rocks their weight while entering the car from the left side, which their phone in the inner pocket.

FIG. 8E-1 is a simplified plot of roll as a function of time for a driver entering a vehicle with a phone in an outside pocket according to an embodiment of the present invention. As illustrated in FIG. 8E-1, if the phone is in the driver's outside pocket, there is a continuous increase in the roll value as the passenger enters the vehicle. This continuous increase in roll value is associated with the driver having the phone in their outside pocket as the passenger enters the vehicle.

FIG. 8E-2 is a simplified plot of pitch as a function of time for a driver entering a vehicle with a phone in an outside pocket according to an embodiment of the present invention. The pitch of the phone goes from a relatively low value to high value, due to the nature of how a user rocks their weight while entering the car from the left side, which their phone in the outer pocket.

It should be appreciated that the specific steps illustrated in FIG. 8A provide a particular method of determining if a user entered from the left or right side of a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 8A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9A:
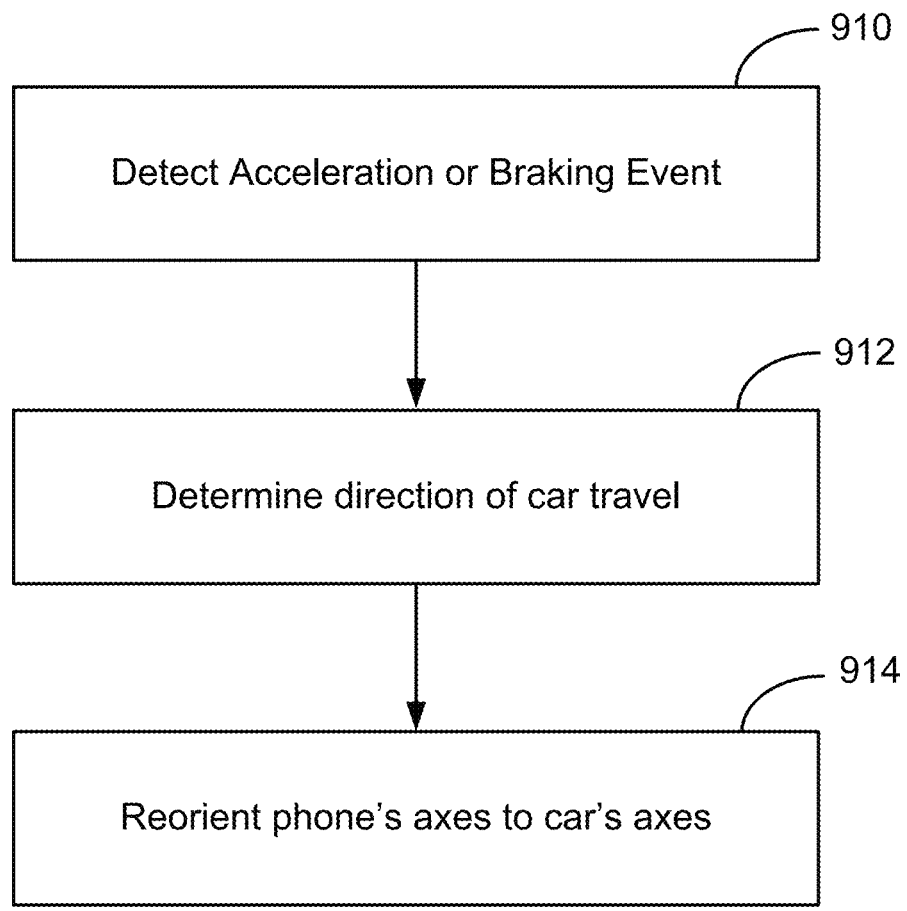
FIG. 9A is a simplified flowchart illustrating a method of aligning a phone with respect to an axis of a vehicle according to an embodiment of the present invention.

FIG. 9A is a simplified flowchart illustrating a method of aligning a phone with respect to an axis of a vehicle according to an embodiment of the present invention. The alignment of the phone with respect to the vehicle is useful in performing a number of the methods described herein, including the methods illustrated in relation to FIGS. 8A-8E, 10-13C, and 15-16. The method includes categorizing an acceleration or a braking event after detection in 910. After a brake or an acceleration event is detected, due to the magnitude profile and direction of said brake or acceleration, we can use the accelerometer information that we obtain from 3 orthogonal axis of the phone's accelerometer to derive the direction in which the car is traveling. Once this information is obtained using vector transformations we can align the 3-axes of the phone to the 3 axes of the car.

Figure 9B:
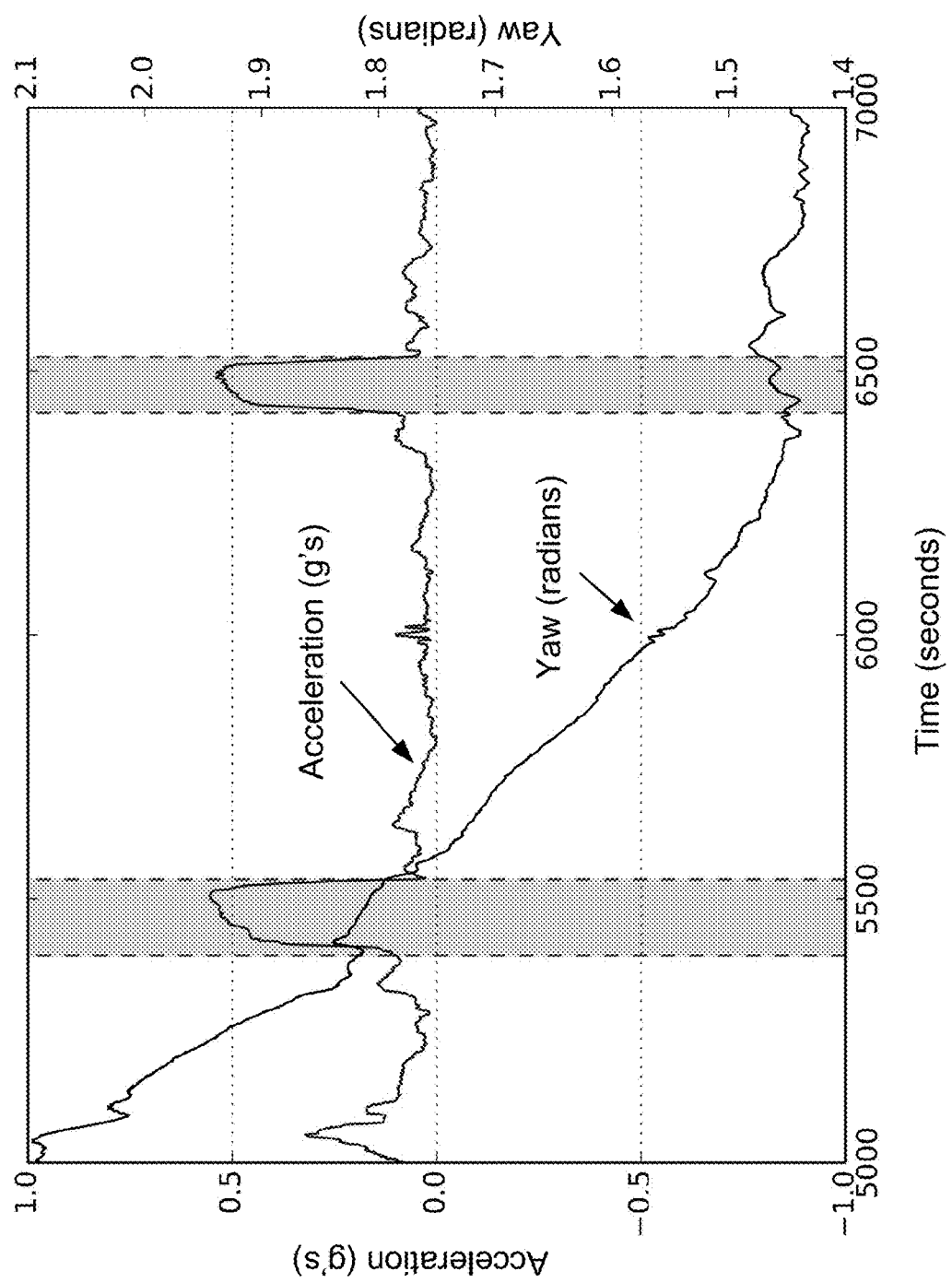
FIG. 9B is a simplified plot and expanded view of acceleration data during a driving event according to an embodiment of the present invention.

FIG. 9B is a simplified plot and expanded view of acceleration data during a driving event according to an embodiment of the present invention. Referring to FIG. 9B, the accelerometer data, corresponding the accelerations applied to the phone, and the yaw data, corresponding to the car's rotations around the z-axis (e.g. turns), is collected during the driving event from the three-axis accelerometer and the gyroscope in a phone, illustrating in this example, of 2 braking events, represented by the data contained within the gray columns. That is, the data contained within the gray columns corresponds to the acceleration data in the x-y plane and the yaw corresponding to two braking events, and the data contained within the white background corresponds to acceleration data in the x-y plane and yaw corresponding to events that are not brakes. The magnitude of the X and Y components of the acceleration ($sqrt(x^2+y^2)$) includes two peaks aligned with the gray columns of the graph and the yaw is generally decreasing as a function of time. In order to determine that an event was either a braking event (note: the same analysis is applied to acceleration events separately, the process of detecting acceleration events mimics the process to detect braking events), as opposed an event that is not braking. We first partition the trips data into possibly overlapping windows of accelerometer data. The windows are defined by their start and end times and are composed of acceleration data due to the car projected onto the x-axis and the y-axis of the phone. Over each window we extract meaningful parameters, defined by a real number, that tend to be similar among brakes, and different between brakes and non-brakes (e.g. turns, bumps, etc.). Such parameters can include the accelerometer data's mean, standard deviation, skewness, kurtosis, energy ratio, wavelet coefficients, FFT coefficients, features obtained from unsupervised feature learning algorithms such as Sparse Auto-Encoders, Restricted Boltzmann Machines, etc. Once these parameters are determined over each window, the parameters of each window are saved into a matrix of real numbers. Simple scaling procedures are applied to the numbers so that they are on a range on the order of −1 to 1. Next, the parameters are used in a classification machine learning algorithm (e.g. support vector machine, neural network, random forest, k-means clustering, etc.) to classify whether or not the data contained within each window represents a brake or not. Each window is assigned a classification, which is a prediction whether or not the data within each window is a brake or not. The data contained within the gray windows of FIG. 9B are segments of the accelerometer data that were classified as a braking event, whereas the accelerometer data contained within windows that are not gray corresponds to windows that were not classified as braking events. This allows us to not only detect the events over the data we trained our machine learning algorithm, but we can use the machine learning algorithm to classify future events.

The method also includes using the acceleration and/or braking events to determine the vehicle's direction of travel (912) relative to the direction of the phone. After identifying a braking or an acceleration event, the three axes of the acceleration data are rotated around the z-axis by 360 degrees in predetermined steps (e.g., 1 degree steps) to find the maximum value of acceleration projected onto the y-axis of the phone as a function of degrees. The maximum value of the acceleration projected onto the y-axis of the phone can also be found using analytical methods. The angle around the z-axis by which the maximum y-value is obtained corresponds to the angle by which the phone needs to be rotated around the z-axis to be aligned to the car's reference frame. The orientation of the vehicle is then aligned with the reference frame of the vehicle. Given this rotation, rotation matrices are created, which are then used to align the phone's axes with respect to the vehicle's axes (914). Note that proper alignment utilizes the methods described in FIG. 10.

It should be appreciated that the specific steps illustrated in FIG. 9A provide a particular method of aligning a phone with respect to an axis of a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 9A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
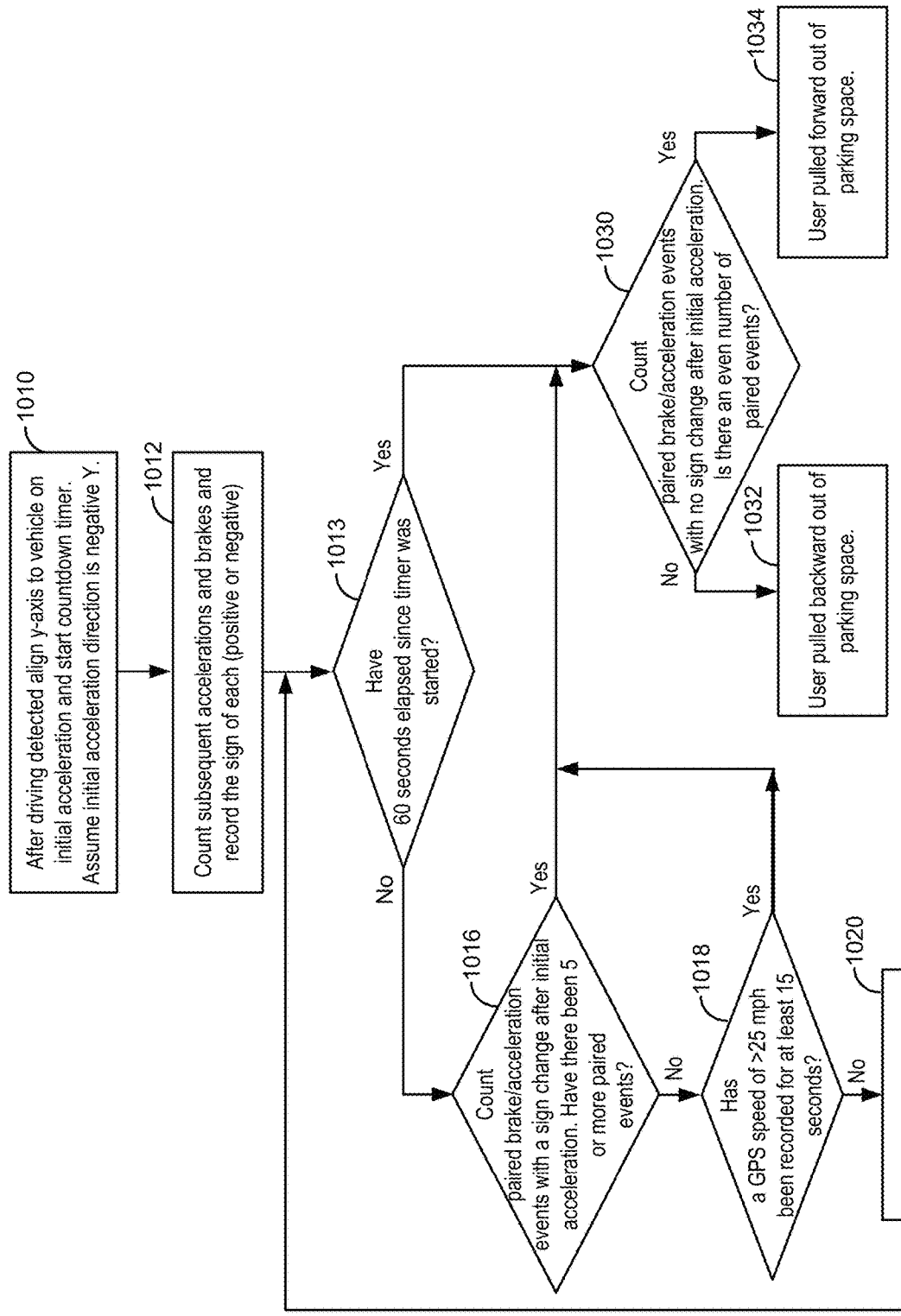
FIG. 10 is a simplified flowchart illustrating a method of determining if a user is backing up out of a parking space or pulling forward out of a parking space according to an embodiment of the present invention.

FIG. 10 is a simplified flowchart illustrating a method of determining if a user is backing up out of a parking space or pulling forward out of a parking space according to an embodiment of the present invention. Although this figure relates to determining if a user is pulling backwards out of a parking space or pulling forward out of parking space, a similar method is applicable to determining if a user is pulling forward into a parking space or backing into a parking space. One of ordinary skill in the art would recognize many variations, modifications, and alternatives.

The method includes, after driving has begun, aligning the y-axis to the vehicle on the initial acceleration and starting a countdown timer. Initial acceleration is used since the user will initially accelerate (as opposed to brake) regardless of the vehicle orientation. Using the alignment techniques discussed in relation to FIG. 9A, it is possible to determine the y-axis of the vehicle's motion. In some embodiments, since it is possible to arbitrarily set the direction of the y-axis, the initial vehicle acceleration is assumed to be in the negative y-axis direction.

If it is assumed that a vehicle is driving in the forward orientation, if the vehicle brakes and then accelerates, the sign of the acceleration along the y-axis (i.e., Y acceleration) will change from the brake to the acceleration. If it is assumed that a vehicle is driving in the backward orientation (backing up), if the vehicle brakes and then accelerates, the sign of the Y acceleration will not change from the brake to the acceleration. This distinction is used to differentiate between backing up or pulling forwards out of a parking space in the cases where a vehicle either (a) backs up, then pulls forward (b) pulls forward, stops, then pulls forward again or (c) pulls forward and continues driving. Note that this method also applies to parking. Since the phone may change orientation with respect to the vehicle during a drive, the phone axis must be reoriented when the vehicle stops. Similar steps are applied to parking as discussed for pulling out of a parking spot but they are essentially executed in the opposite order. One of ordinary skill in the art would recognize many variations, modifications, and alternatives.

In the scenarios when a user might make an arbitrary number of brake and acceleration events when backing up and/or pulling forward, an additional method is employed. In this method, the brake and acceleration events over a period of time (e.g., one minute) are analyzed. At the end of the time period (e.g., at the end of the minute), the number of brake and acceleration events for which the sign of the Y acceleration changed from the brake to the acceleration are determined. It will be noted that eventually the user will be driving in the forward direction, regardless of the number of times they change direction to get out of a parking spot. In an embodiment, once a predetermined number of acceleration changes in a row (e.g., five) have been observed for which the sign of the Y acceleration changes for the brake to the acceleration, then the conclusion can be made that the vehicle is moving in the forward direction. Then, it is possible to count back to the first acceleration event to determine if the car pulled out of the parking spot in a forward or backwards orientation.

Referring to FIG. 10, the method includes, after the driving event is detected, aligning the y-axis of the mobile device to the reference frame of the vehicle upon or after the initial acceleration and starting a countdown timer (1010). In some embodiments, the assumption is made that the initial acceleration is in the negative Y direction. The method also includes counting (e.g., all) subsequent forward acceleration and braking events and recording the sign (either positive or negative) of each event (1012). If a predetermined time (e.g., 60 seconds) has elapsed since the timer was started (1013), then the number of paired brake/acceleration events with no sign change are counted after the initial acceleration (1030). If the number of paired events is even, then the user has pulled forward out of the parking spot (1034). If the number of paired events is odd, then the user has pulled backward out of the parking spot (1032). Thus, an even number of direction changes indicates an initial "pull forward" event and an odd number of direction changes indicates an initial "back out" event.

If, the predetermined period of time has not elapsed since the timer was started, then the number of paired brake/acceleration events with a sign change after the initial acceleration are counted (1016). If the number of paired events is greater than or equal to a predetermined number of acceleration changes in a row (e.g., greater than or equal to five) (1018), then the method proceeds to element 1030. If the number of paired events is less than the predetermined number, then a determination is made of whether or not the vehicle has been traveling at a speed of greater than a threshold speed (e.g., 25 miles per hour) for at least a predetermined time (15 seconds). If the car has been traveling at the threshold speed for the predetermined time, then the method proceeds to element 1030. If the car has not been traveling at the threshold speed for the predetermined time, then a defined delay (e.g., one second) is taken (1020) and the method returns to element 1014.

It should be appreciated that the specific steps illustrated in FIG. 10 provide a particular method of determining if a user is backing up or pulling out of a parking space according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Table 1 illustrates the acceleration values projected onto the y-axis of the phone for braking and acceleration for several scenarios. In the first scenario, there are five paired events for which the signs of the acceleration due to braking projected on the y-axis of the phone, and acceleration due to accelerations projected on the y-axis of the phone are different, which indicates that the vehicle is driving in the forward direction. The previous pair indicates that a direction change occurred. The initial acceleration was in the negative direction, indicating that the vehicle was backed out and then driven in the forward direction. In the second scenario, there are five paired events for which the signs of the acceleration due to braking projected on the y-axis of the phone, and acceleration due to accelerations projected on the y-axis of the phone are different, which indicates that the vehicle is driving in the forward direction. The two previous pairs indicates that direction changes occurred for both pairs. The initial acceleration was in the negative direction, indicating that the vehicle was driven out in the forward direction, then stopped, backed up, and then drove away in the forward direction.

TABLE 1

Examples of pulling out of a parking spot forward or backward

| Scenario | Y sign brake | Y sign accel | Interpretation of data | Result |
|---|---|---|---|---|
| 1 | − | + | 5 in a row with sign changes means driving in forward direction | Back out, then drive forward |
|  | − | + |  |  |
|  | − | + |  |  |
|  | − | + |  |  |
|  | − | + |  |  |
|  | + | + | Direction change Initial acceleration |  |
| 2 | + | − | 5 in a row with sign changes means driving in forward direction | Pull out forward, then stop and back up, then drive forward |
|  | + | − |  |  |
|  | + | − |  |  |
|  | + | − |  |  |
|  | + | − |  |  |
|  | − | − | Direction change |  |
|  | + | + | Direction change Initial acceleration |  |

Although particular values for the predetermined time (e.g., 60 seconds), the number of paired brake/acceleration events that were analyzed (e.g., five pairs), the threshold speed (e.g., 25 miles per hour) and the predetermined time that this speed is maintained (15 seconds), and the defined delay (e.g., one second) are utilized in relation to FIG. 10, these particular values are not required by the present invention and other values can be used as appropriate to the particular application.

In summary, there are three scenarios in which the method in FIG. 10 is utilized to determine the vehicle's orientation. 1) If we observe 5 consecutive sign changes, we assume that the user must be driving in the forward direction (we assume these sign changes are from standard braking events followed by acceleration events). 2) If 60 seconds passes we assume that a user has begun driving in the forward direction and is no longer backing up or changing directions. From the 60-second mark we then count back to the initial acceleration. An even number of direction changes indicates an initial "pull forward" event and an odd number of direction changes indicates an initial "back out" event. 3) If a GPS speed is registered above 25 miles per hour for at least 15 seconds or if 5 GPS points are registered for a vehicle on a typical roadway, we assume the user is driving in the forward direction. If any of these scenarios play out we then count back to the initial acceleration. An even number of direction changes indicates an initial "pull forward" event and an odd number of direction changes indicates an initial "back out" event.

FIG. 11 is a simplified flowchart illustrating various acceleration-based methods of determining if a user entered a vehicle on the left or right side according to an embodiment of the present invention. For reference, the method illustrated in FIG. 11 is applicable to element 618 of FIG. 6. The method utilizes entry and exit methods of determining if a user is on the left or right hand side of a vehicle and methods of determining if a user is on the left or right hand side of a vehicle while driving. The method includes providing aligned phone data (1110). Data is extracted from the time window around the enter signal time stamp (1112) and from the driving event (1114) as the beginning of two branches of implementing entry and exit methods. The vector product method (1116) is described in FIGS. 12A-C. The integral method (1118) is described in FIGS. 13A-C. The seat belt method (1122) is described in FIG. 14A. If the phone is detected as being in the upper pocket as described in FIG. 14A, then this will be weighted such that other methods are not used or reduced in significance for making the left/right prediction. If the phone is not detected in the upper pocket, then the remaining entry/exit methods (integral method and vector product method) will be coupled with the "during drive" method (centripetal acceleration algorithm). Each method will be given a weight based on the accuracy of the data (1128) and a left/right determination will be made (1130).

It should be appreciated that the specific steps illustrated in FIG. 11 provide a particular method of using various methods of determining from which side a user entered a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12A:
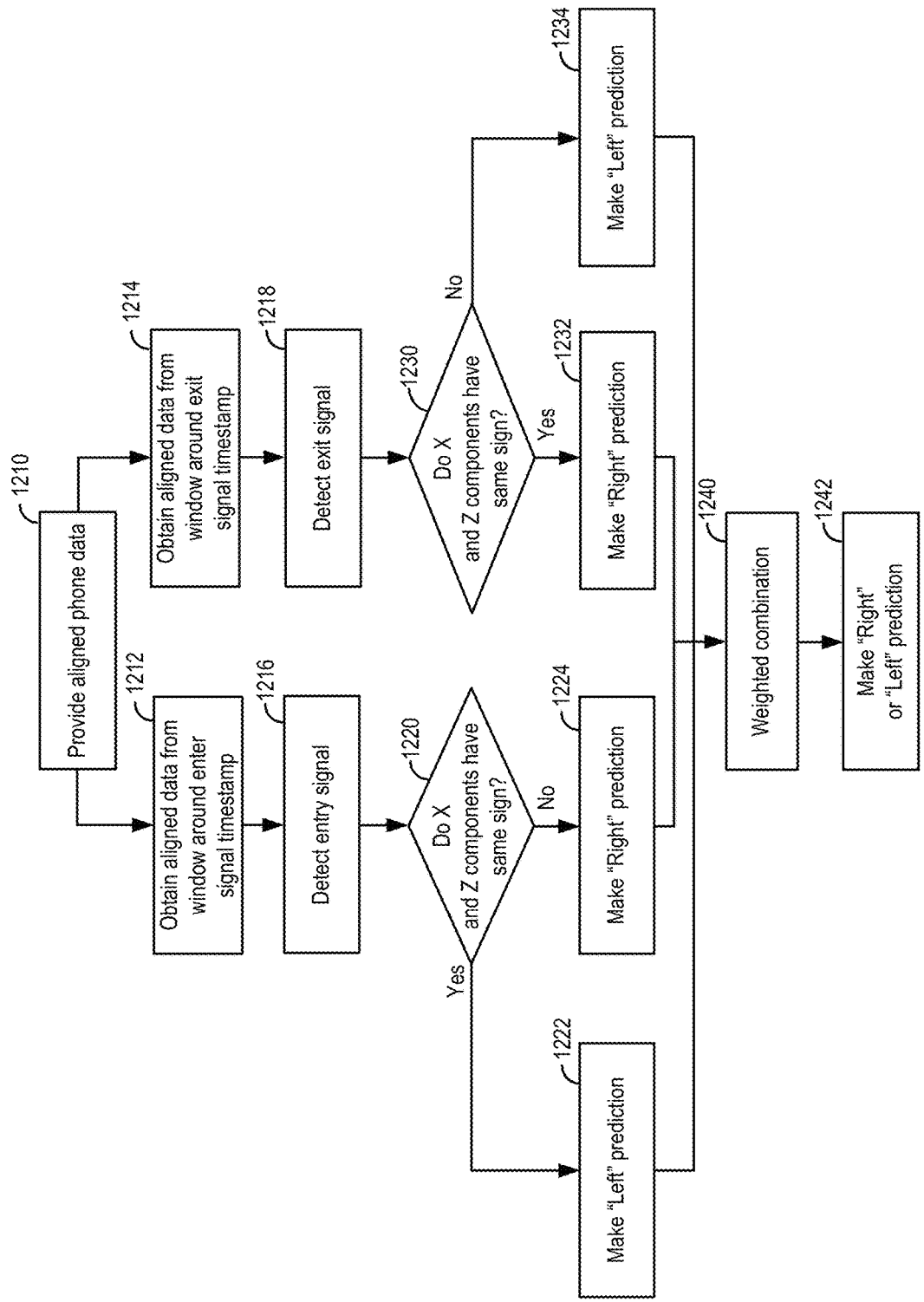
FIG. 12A is a simplified flowchart illustrating a method of determining if a user entered a vehicle from the left or right side using acceleration components according to an embodiment of the present invention.

FIG. 12A is a simplified flowchart illustrating a method of determining if a user entered a vehicle from the left or right side using acceleration components according to an embodiment of the present invention. As described below, this method provides an additional technique for determining from which side the driver entered the vehicle by analyzing the unique characteristics of the phone's accelerometer along two axes. As described herein the six faces of the phone define three orthogonal coordinates. When these coordinates are aligned to the vehicle's reference frame, there exist a combination of unique signals that distinguish passenger entry from driver entry. When a person enters the vehicle from the passenger's side the accelerations along the z-axis (i.e., the Z component, which is aligned with z-axis) and the x-axis (i.e., the X component, which is aligned with x-axis) will have opposite signs: The z-axis acceleration will be positive and the x-axis acceleration will be negative. On the other hand, if a person enters a vehicle from the driver's side, the accelerations along the x-axis and the z-axis will have the same sign: Both accelerations will be positive. Similarly, when a person exits the vehicle on the passenger's side, the z-axis acceleration will be negative and the x-axis acceleration will be positive. Finally, when a person exits the vehicle on the driver's side, there will be both a negative x-axis and z-axis acceleration.

Referring to FIG. 12A, aligned data from the phone is provided (1210). Aligned data from the window around the enter signal time stamp (1212) and aligned data from the window around the exit signal time stamp (1214) are obtained and used. In order to identify the appropriate windows to analyze, the entry and exit windows identified in relation to FIG. 5 are utilized. In the entry portion of the method, the entry signal is detected (1216). A determination is made of whether the X and Z components have the same sign (1220). If the components have the same sign, then the method makes a "Left" prediction (1222). If the components have opposite signs, then the method makes a "Right" prediction (1224). In the exit portion of the method, the exit signal is detected (1218). A determination is made of whether the X and Z components have the same sign (1230). If the components have the same sign, then the method makes a "Right" prediction (1232). If the components have opposite signs, then the method makes a "Left" prediction (1234). Once the left and right predictions are made, a weighted combination or average can be computed (1240) in order to make an updated "Right" or "Left" prediction (1242).

Figure 12B:
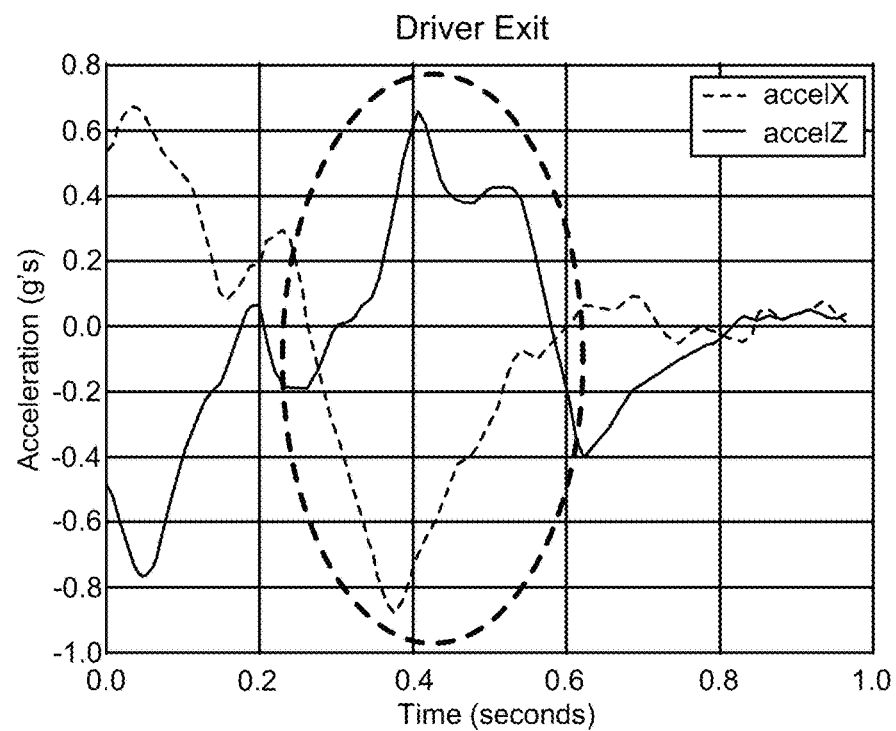
FIG. 12B is a simplified plot illustrating acceleration components as a function of time for an exit on a driver's side of a vehicle according to an embodiment of the present invention.
Figure 12C:
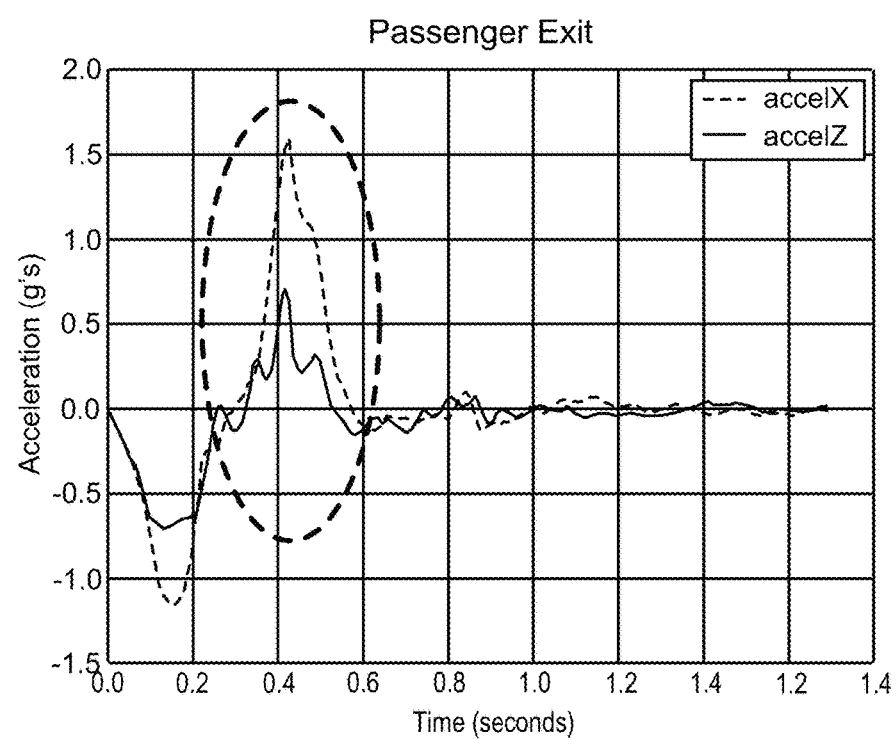
FIG. 12C is a simplified plot illustrating acceleration components as a function of time for an exit on a passenger's side of a vehicle according to an embodiment of the present invention.

FIG. 12B is a simplified plot of the vector product method illustrating acceleration components as a function of time for an exit on a driver's side of a vehicle according to an embodiment of the present invention. FIG. 12C is a simplified plot illustrating the acceleration components projected onto the x-axis and the z-axis of the phone (which are themselves aligned to the vehicle's longitudinal and transversal directions) as a function of time for an exit on a passenger's side of a vehicle according to an embodiment of the present invention. Referring to FIGS. 12B and 12C, the acceleration projected onto the x-axis and the z-axis, called the X component of the acceleration and the Z component of the acceleration, are shown as a function of time for both a driver and a passenger exiting a vehicle. Once the exit window is determined, and the X component is aligned to the vehicle's transverse reference frame, an anomaly detection algorithm is implemented to detect the acceleration spikes associated with the user exiting the car. The anomaly detection algorithm may include calculating substantial deviation for the norm in statistical measures (e.g. mean, standard deviation), FFT peak detection, unsupervised anomaly detection machine learning algorithms (e.g. k-nearest neighbor, local outlier factor), or supervised anomaly detection machine learning algorithms (one class Support vector machines, replicator neural networks). The circled area designates the actual event of exiting the car. As shown in FIG. 12B, as the driver exits the vehicle, the X component is a negative acceleration while the Z component is a positive acceleration. As shown in FIG. 12C, as the passenger exits the vehicle, both the X component and the Z component have acceleration values that have the same sign (i.e., both positive or negative) which can be defined by the area of the signal between the full width half max values or another other similar metric. This same sign value results since when the phone is aligned to the frame of reference of the vehicle, the acceleration values align based on this convention. Note that this method applies to both entry and exit. During entry, the values of the x and z accelerations are opposite of those shown in FIGS. 12B and 12C.

It should be appreciated that the specific steps illustrated in FIG. 12A provide a particular method of determining if a user entered a vehicle from the left or right side using acceleration components according to an embodiment of the present invention. Other sequences of steps may also be performed according to alternative embodiments. For example, alternative embodiments of the present invention may perform the steps outlined above in a different order. Moreover, the individual steps illustrated in FIG. 12A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13A:
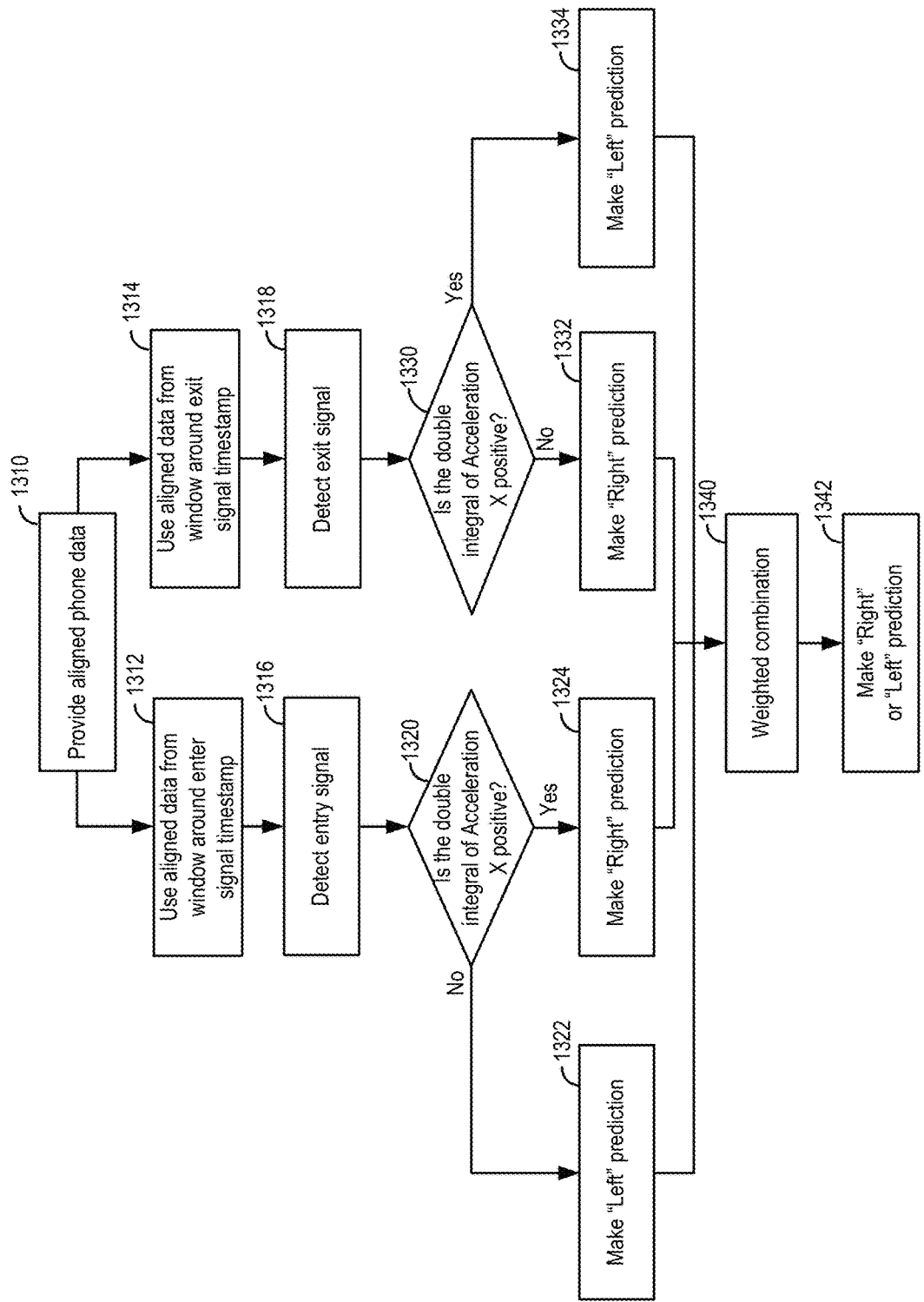
FIG. 13A is a simplified flowchart illustrating a method of determining if a user entered a vehicle from the left or right side using acceleration components according to an alternative embodiment of the present invention.

FIG. 13A is a simplified flowchart illustrating a method of determining if a user entered a vehicle from the left or right side using acceleration components according to an alternative embodiment of the present invention. As described below, this method provides an additional technique for determining from which side the driver entered the vehicle by analyzing distinct changes in magnitude and direction of X acceleration.

In particular, this method utilizes unique accelerations perpendicular to the vehicle to determine from which side a user exits the vehicle. As described in relation to FIG. 13A, an analysis is performed including a computation of the double integral of the accelerations along the x-axis of the vehicle (with the negative x-axis extending out the driver's side and the positive x-axis extending out the passenger's side), with alignment between the phone and the vehicle as described in relation to FIG. 9A. It should be noted that calculating the double integral is non-trivial, resulting in the use of Kalman filters, high-pass filters, and complementary filters to compensate for gyroscopic drift and accelerometer noise. The double integral is then computed along the perpendicular axis to identify the direction traveled when exiting the vehicle.

If the double integral of acceleration is negative, then it can be determined that the user exited to the left, i.e., from the left side of the vehicle. For the four possible scenarios: (i) positive double integral of x-axis acceleration=passenger's side exit; (ii) positive double integral of x-axis acceleration=driver's side entry; (iii) negative double integral of x-axis acceleration=driver's side exit; (iv) negative double integral of x-axis acceleration=passenger's side entry. Note that in (i) and (ii) the double integral is the same and that in (iii) and (iv) the double integral is the same. We differentiate between these scenarios by first determining if we are in an entry or exit situation using the process in FIG. 2 and FIG. 2A. Therefore, if we observe entry (a walking classification followed by driving classifications) and a positive double integral of x-axis acceleration, we know we have driver's side entry. This process applies to the other situations so that we can differentiate between all scenarios. The unique scenarios are: (v) exit and positive double integral of x-axis acceleration detected=passenger's side exit; (vi) entry and positive double integral of x-axis acceleration detected=driver's side entry; (vii) exit and negative double integral of x-axis acceleration detected=driver's side exit; (viii) entry and negative double integral of x-axis acceleration detected=passenger's side entry.

Referring to FIG. 13A, the method includes providing aligned phone data (1310). Aligned data from the window around the enter signal time stamp (1312) and aligned data from the window around the exit signal time stamp (1314) are used. In order to identify the appropriate windows to analyze, the entry and exit windows identified in relation to FIG. 5 are utilized. In the entry portion of the method, the entry signal is detected (1316). A determination is made of whether the double integral of the acceleration along the x-axis, i.e., the X component, is positive (1320). If the double integral is negative, then the method makes a "Left" prediction (1322). If the double integral is positive, then the method makes a "Right" prediction (1324). In the exit portion of the method, the exit signal is detected (1318). A determination is made of whether the double integral is positive (1330). If the double integral is negative, then the method makes a "Right" prediction (1332). If the double integral is positive, then the method makes a "Left" prediction (1334). Once the left and right predictions are made, a weighted combination or average can be computed (1340) in order to make an updated "Right" or "Left" prediction (1342).

Figure 13B:
FIG. 13B is a simplified plot illustrating the value of the double integral of the X component as a function of time for an exit on a driver's side of a vehicle according to an embodiment of the present invention.
Figure 13C:
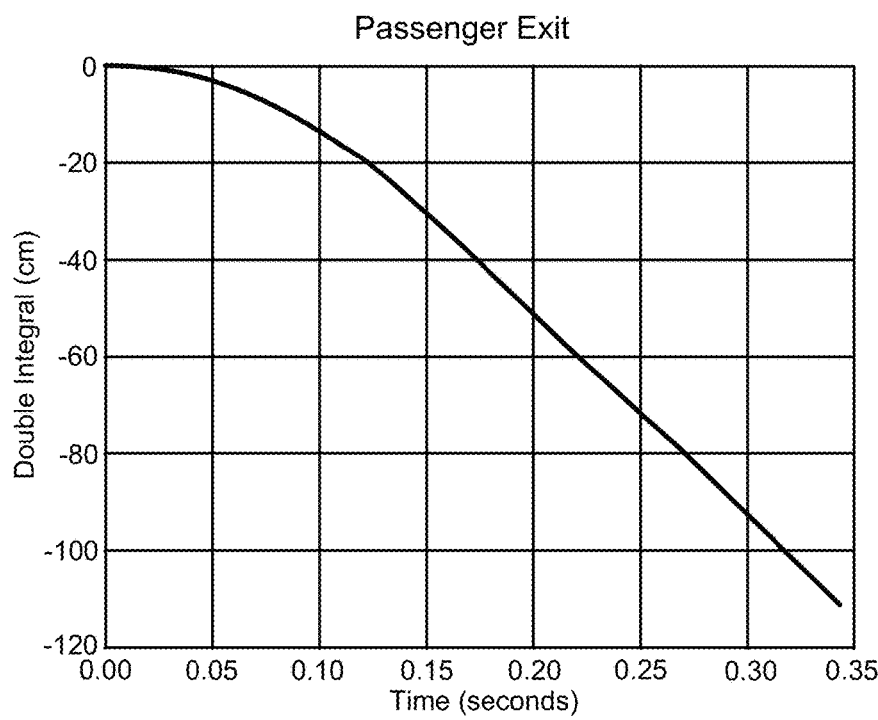
FIG. 13C is a simplified plot illustrating the value of the double integral of the X component as a function of time for an exit on a passenger's side of a vehicle according to an embodiment of the present invention.

FIG. 13B is a simplified plot illustrating the value of the double integral of the X component as a function of time for an exit on a driver's side of a vehicle according to an embodiment of the present invention. FIG. 13C is a simplified plot illustrating the value of the double integral of the X component as a function of time for an exit on a passenger's side of a vehicle according to an embodiment of the present invention. As shown in FIG. 13B, as the driver exits the vehicle, the double integral of the X component is positive. As shown in FIG. 13C, as the passenger exits the vehicle, the double integral is negative.

It should be appreciated that the specific steps illustrated in FIG. 13A provide a particular method of determining if a user entered a vehicle from the left or right side using acceleration components according to an alternative embodiment of the present invention. Other sequences of steps may also be performed according to alternative embodiments. For example, alternative embodiments of the present invention may perform the steps outlined above in a different order. Moreover, the individual steps illustrated in FIG. 13A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14A:
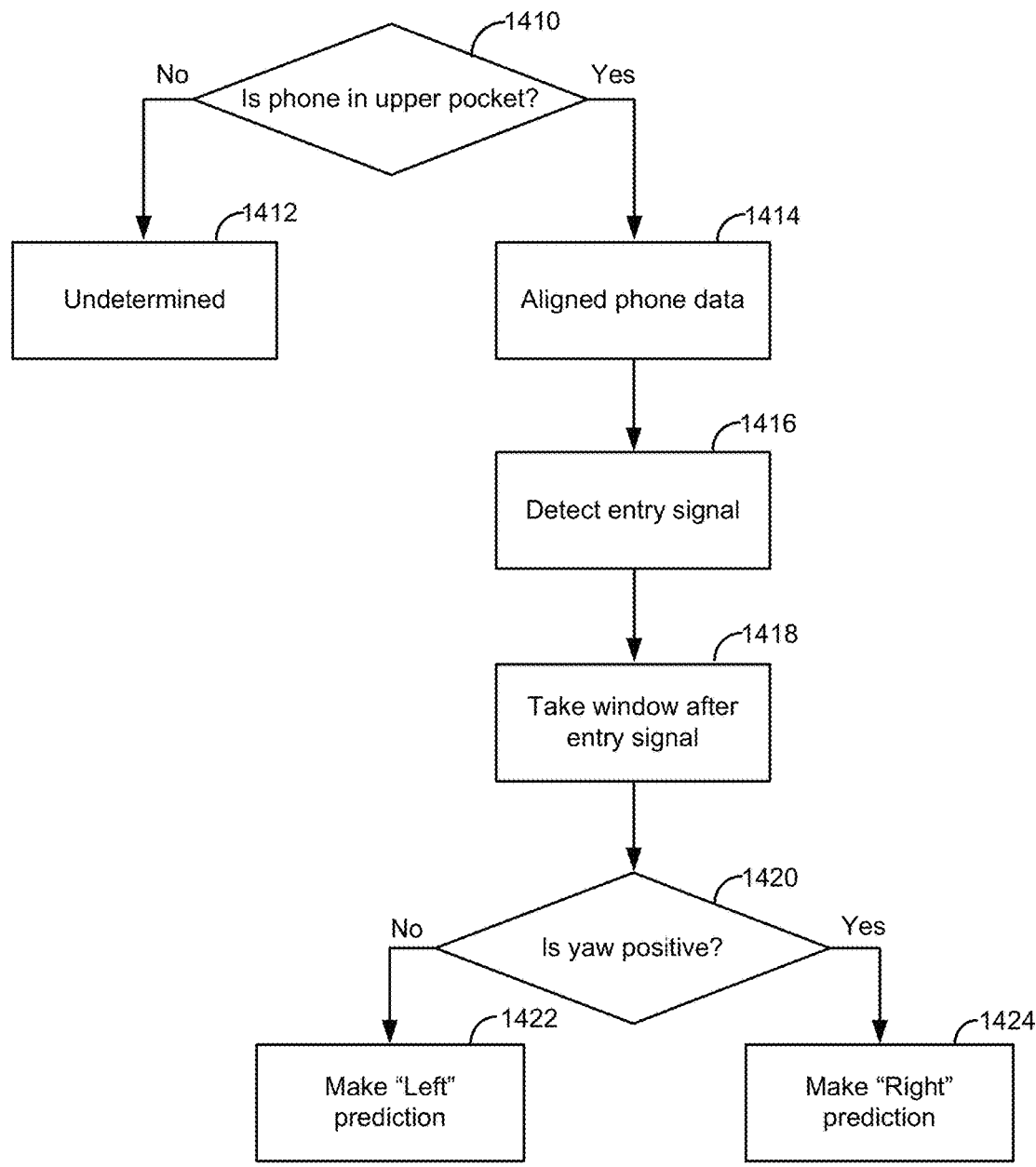
FIG. 14A is a simplified flowchart illustrating a method of determining which side a user enters a vehicle according to an embodiment of the present invention.

FIG. 14A is a simplified flowchart illustrating a method of determining which side a user enters a vehicle according to an embodiment of the present invention. The method illustrated in FIG. 14A, which may be referred to as a seat belt algorithm, is used when the phone is in the user's upper pocket or jacket pocket. This method utilizes unique movements that occur when a user enters the vehicle and then buckles their seatbelt. For the driver, there is a leftward rotation when reaching for the seatbelt followed by a rightward rotation when the seatbelt is buckled. For the passenger these rotations are reversed, creating a unique distinction between the driver and passenger. As described in relation to FIG. 14A, these unique movements are detected by taking gyroscope, accelerometer, and compass data, and transforming to an absolute reference frame using the calculated rotation matrix to detect these rotations. Note that this method applies to both entry and exit. FIG. 14A shows entry. For exit, the opposite predictions would be made (i.e. if yaw is positive make "right" prediction upon exit).

The method includes determining if the phone is in the user's upper pocket (1410). If not, then this method is not used (1412). If the phone is in the user's upper pocket, then aligned data from the window around the enter signal time stamp (1414) is used. In order to identify the appropriate windows to analyze, the entry window identified in relation to FIGS. 2 and 5 is utilized. The entry signal is detected (1416) and a window following the entry signal is obtained (1418). In this window, a determination is made if the yaw is positive (1420). If the yaw is negative, then the method makes a "Left" prediction (1422). If the yaw is positive, then the system makes a "Right" prediction (1424). We then use this reoriented data from the gyroscope and analyze the first derivative of the yaw axis data, the variance of the yaw, and the variance of the three axes of the accelerometer data to distinguish this signature from the rest of the non-signature data collected. We then feed this data into our SVM algorithm for detection and training to increase the accuracy of distinguishing signature cases from non-signature cases. The SVM is trained on the variance of the yaw, the variance of the 3 dimensional accelerometer data, and the first and second derivatives of the yaw signal.

Figure 14B:
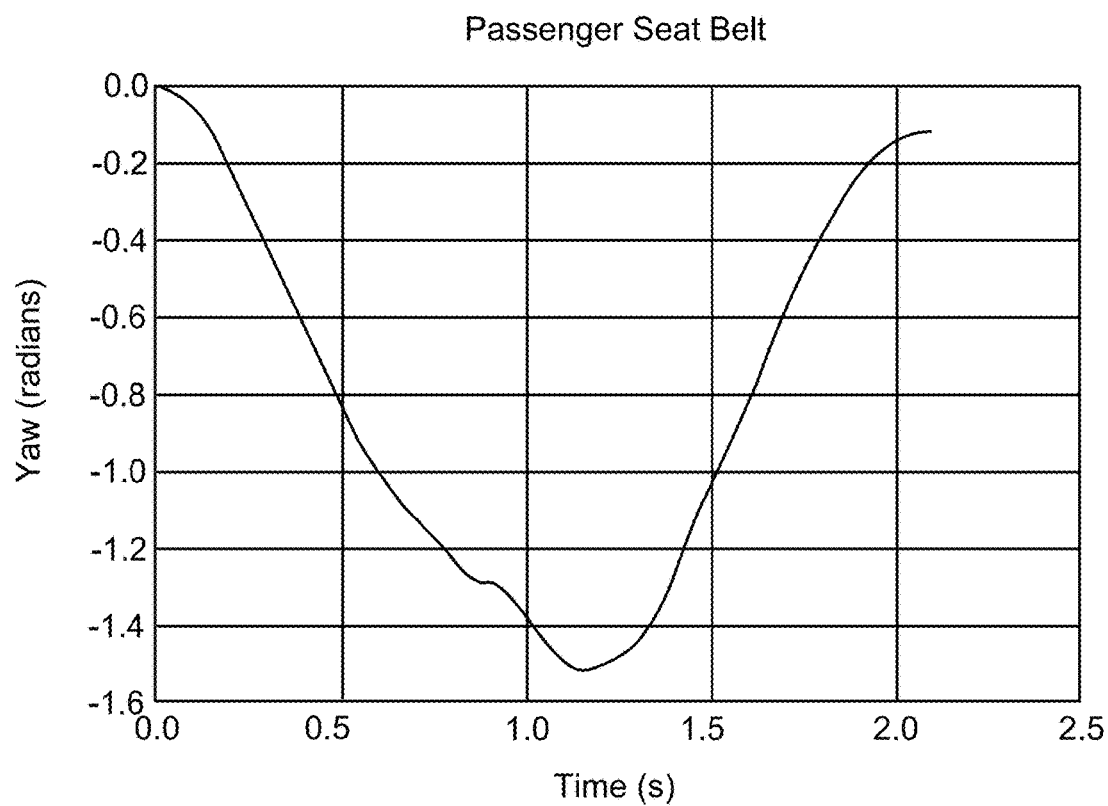
FIG. 14B is a plot illustrating yaw in radians vs. time for a passenger putting on a safety belt according to an embodiment of the present invention.

FIG. 14B is a plot illustrating yaw in radians vs. time for a passenger putting on a safety belt according to an embodiment of the present invention. When a user enters the right side of the vehicle (i.e. the passenger's side), sits in the passenger's seat, and reaches to buckle their seat belt, they must reach to the right in a clockwise rotation relative to the z-axis to grab the seat belt, next they undergo another rotation, this time counter clockwise relative to the z-axis to buckle the seat belt into the seatbelt buckle. This movement is distinct to user's sitting on the right side of the car. The methods works when the yaw angular rotation can be detected. This occurs when the phone is in the person's upper pocket, and jacket pocket, or is influenced by the torso movement caused by the seatbelt buckling movement.

Figure 14C:
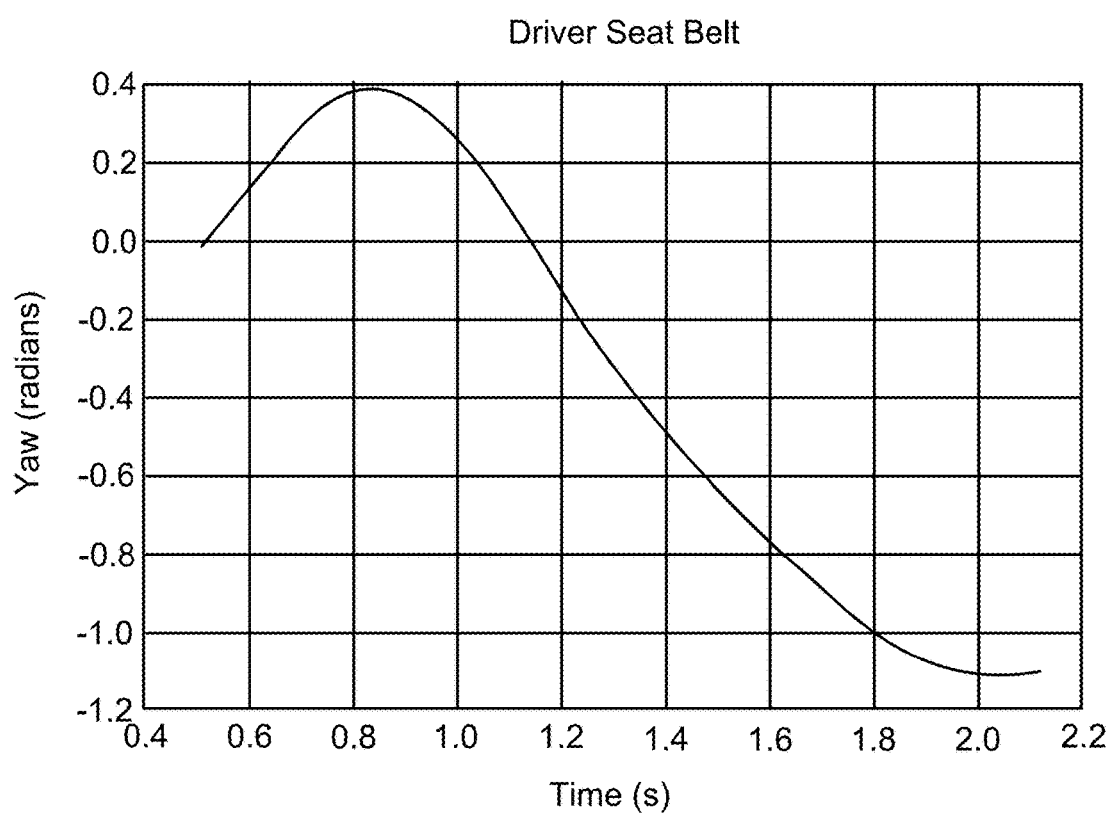
FIG. 14C is a plot illustrating yaw in radians vs. time for a driver putting a safety belt according to an embodiment of the present invention.

FIG. 14C is a plot illustrating yaw in radians vs. time for a driver putting a safety belt according to an embodiment of the present invention. When a user enters the left side of the vehicle (i.e. the driver's side), sits in the driver's seat, and reaches to buckle their seat belt, they must reach to the left in a counter-clockwise rotation relative to the z-axis to grab the seat belt, next they undergo another rotation, this time clockwise relative to the z-axis to buckle the seat belt into the seatbelt buckle. This movement is distinct to user's sitting on the left side of the car. The methods works when the yaw angular rotation can be detected. This occurs when the phone is in the person's upper pocket, and jacket pocket, or is influenced by the torso movement caused by the seatbelt buckling movement.

It should be appreciated that the specific steps illustrated in FIG. 14A provide a particular method of determining which side a user enters a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 14A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
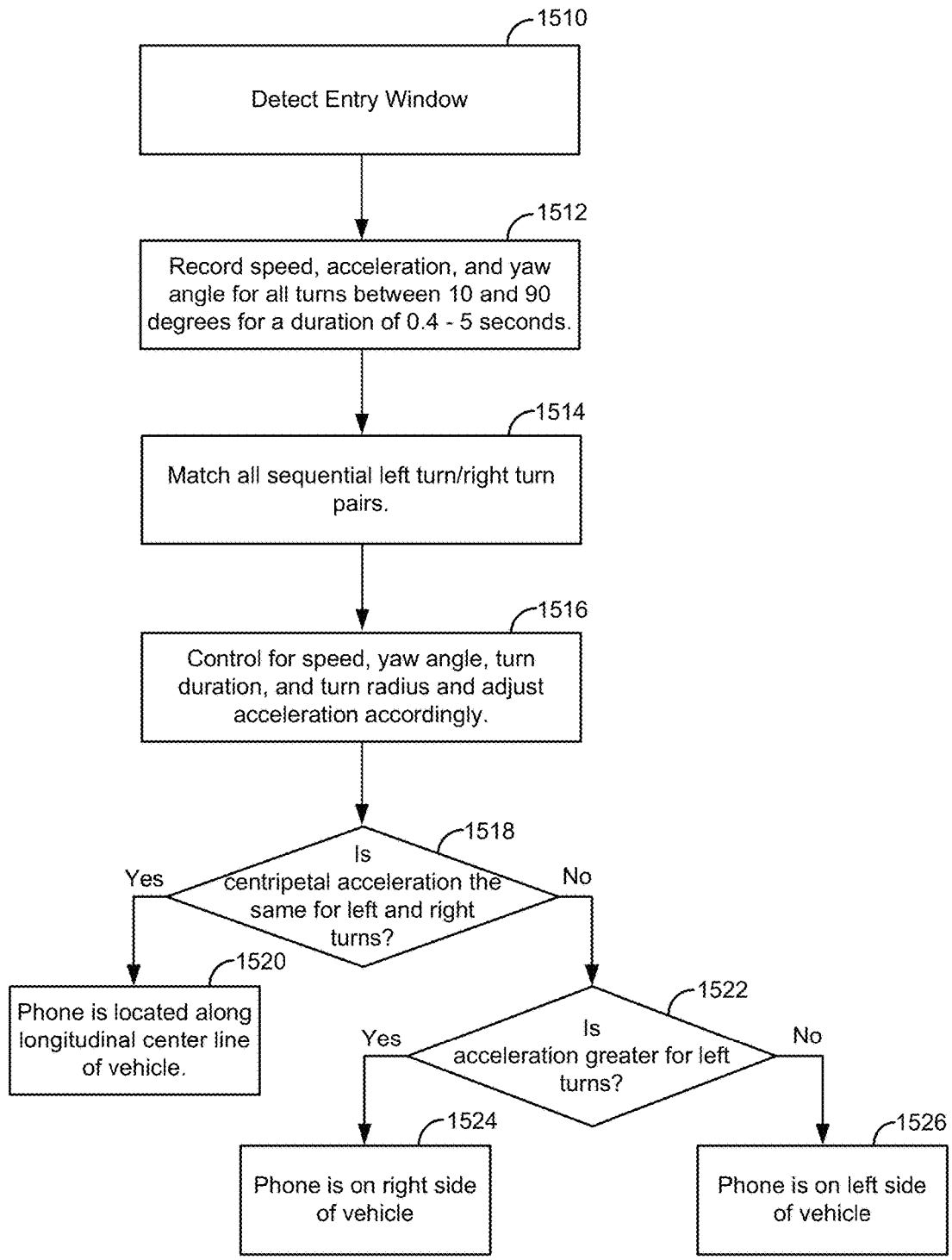
FIG. 15 is a simplified flowchart illustrating a method of determining a location of a phone in a vehicle according to an embodiment of the present invention.

FIG. 15 is a simplified flowchart illustrating a method of determining a location of a phone in a vehicle according to an embodiment of the present invention. The method illustrated in FIG. 15 enables the determination of whether the phone is on the left or right side of the vehicle during a driving event using centripetal acceleration detection. Using the methods described in relation to FIG. 9A, the phone is aligned with the reference frame of the vehicle. Then it is possible to analyze accelerations on the left and right side of the car. Referring to FIG. 15, the entry window is detected (1510). The method includes recording vehicle dynamics, including speed, acceleration, and yaw angle for a series of turns between a predetermined angular range for a predetermined duration (1512). As an example, the speed, acceleration, and yaw angle could be measured for turns between 10 degrees and 90 degrees within a time range of 0.4-5 seconds. When controlling for speed and turn angle, it is possible to examine left and right turns and compare the x-axis and y-axis accelerations to determine if the phone is located on the left or right side of the vehicle.

For example, if the phone were exactly in the center of the car (measured from the left to the right), measurements would produce the same X and Y components in both left and right turns when controlling for speed and angle of turn. If the phone were on the driver's side, then the measurements would show greater accelerations for a right turn than would be measured for a left turn. Thus, this method enables the determination of the side of the vehicle on which the phone is located.

Referring once again to FIG. 15, sequential left turn/right turn pairs are matched (1514). The method controls for the speed, yaw angle, turn duration, and turn radius in order to adjust the accelerations accordingly (1516). If the centripetal acceleration is the same for left and right turns (1518), then the phone is located along the longitudinal center line of the vehicle (1520). If the acceleration is greater for left turns (1522), then the phone is located on the right side of the vehicle (1524). If the acceleration is greater for right turns, then the phone is located on the left side of the vehicle (1526).

It should be appreciated that the specific steps illustrated in FIG. 15 provide a particular method of determining a location of a phone in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
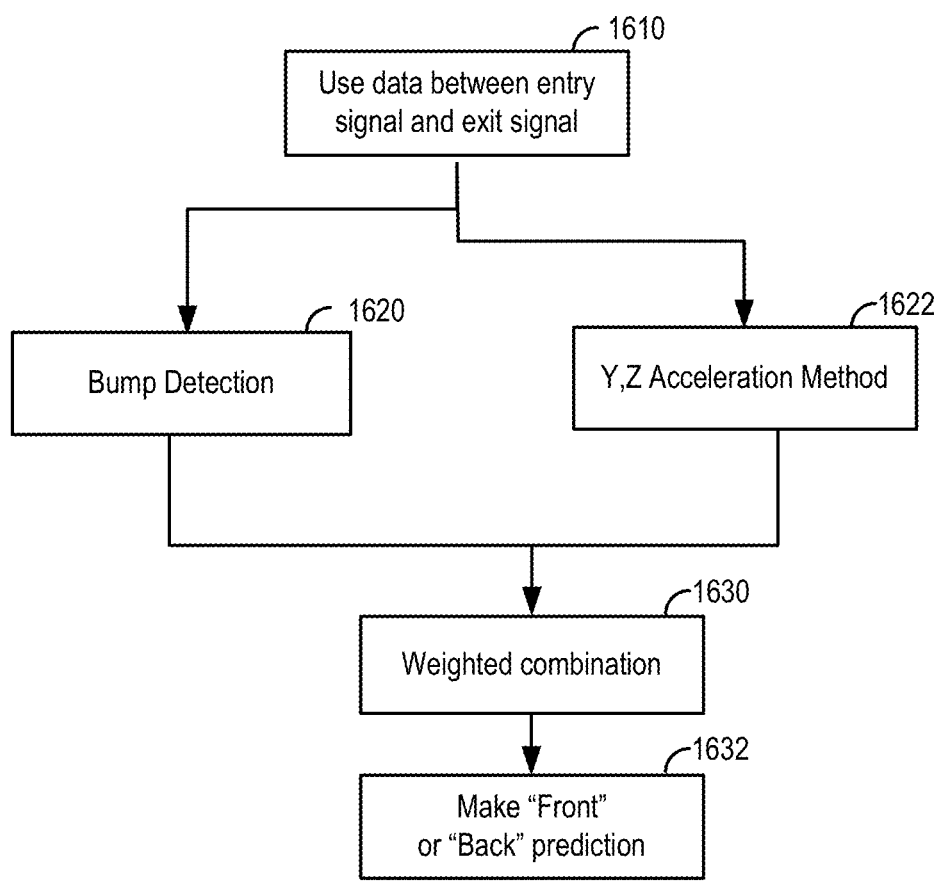
FIG. 16 is a simplified flowchart illustrating a method of determining a longitudinal position of the phone during a driving event according to an embodiment of the present invention.

FIG. 16 is a simplified flowchart illustrating a method of determining a longitudinal position of the phone during a driving event according to an embodiment of the present invention. The method includes aligning the phone with respect to the reference frame of the vehicle using the method discussed in relation to FIG. 9A. The method utilizes the fact that the nature of the z-axis acceleration is different in the front and back of a vehicle, particularly if one can distinguish forward vehicle acceleration events from braking acceleration events as discussed in relation to braking events in FIGS. 9A and 9B. The differences measured in the Z component are due to the location of the phone relative to the axle depending on whether the phone is in the front or back of the vehicle. For example, under braking, there will typically be a positive Z acceleration in the back of the vehicle, whereas there will be a negative Z acceleration in the front of the vehicle. Under forward accelerations, there is also often a z acceleration of higher magnitude in the front of the vehicle. These acceleration differences make it possible to determine if a user is in the front or back of a vehicle.

It should be appreciated that the specific steps illustrated in FIG. 16 provide a particular method of determining a longitudinal position of the phone during a driving event according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

As illustrated in FIG. 16, the method enables making a front vs. back determination using acceleration data according to an embodiment of the present invention. Using the ideas contained within FIG. 5, we have two time stamps that define the start and end of a driving sequence. We truncate the data from the phone to contain data recorded only between these timestamps. We then use the truncated data to concurrently or simultaneously run the Bump Detection FIG. 18B and FIG. 18C and the Y,Z Acceleration Method FIG. 19A and FIG. 19B. If both 1620 and 1622 do not yield an undetermined result, a normalized weighted sum of the calculated probabilities, that the entry point happened at a particular point in time, is computed and a final probability is outputted that is used to determine if the phone is located in the front or the back of the vehicle. If either 1620 or 1622 yield an undetermined result the prediction is made solely on the determined result. If both are undetermined then the prediction is undetermined.

It should be appreciated that the specific steps illustrated in FIG. 16 provide a particular method of making a front vs. back determination according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17A:
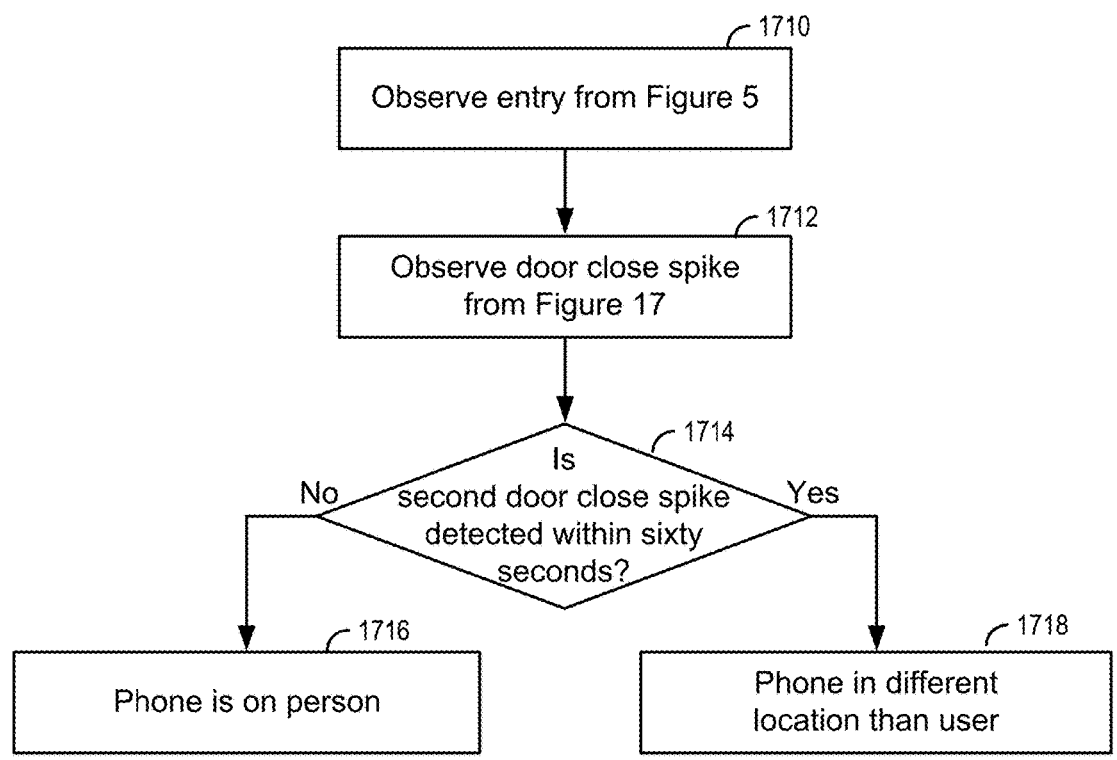
FIG. 17A is a simplified flowchart illustrating a method of determining if a user's phone resides with the user by detecting door closing according to an embodiment of the present invention.
Figure 17B:
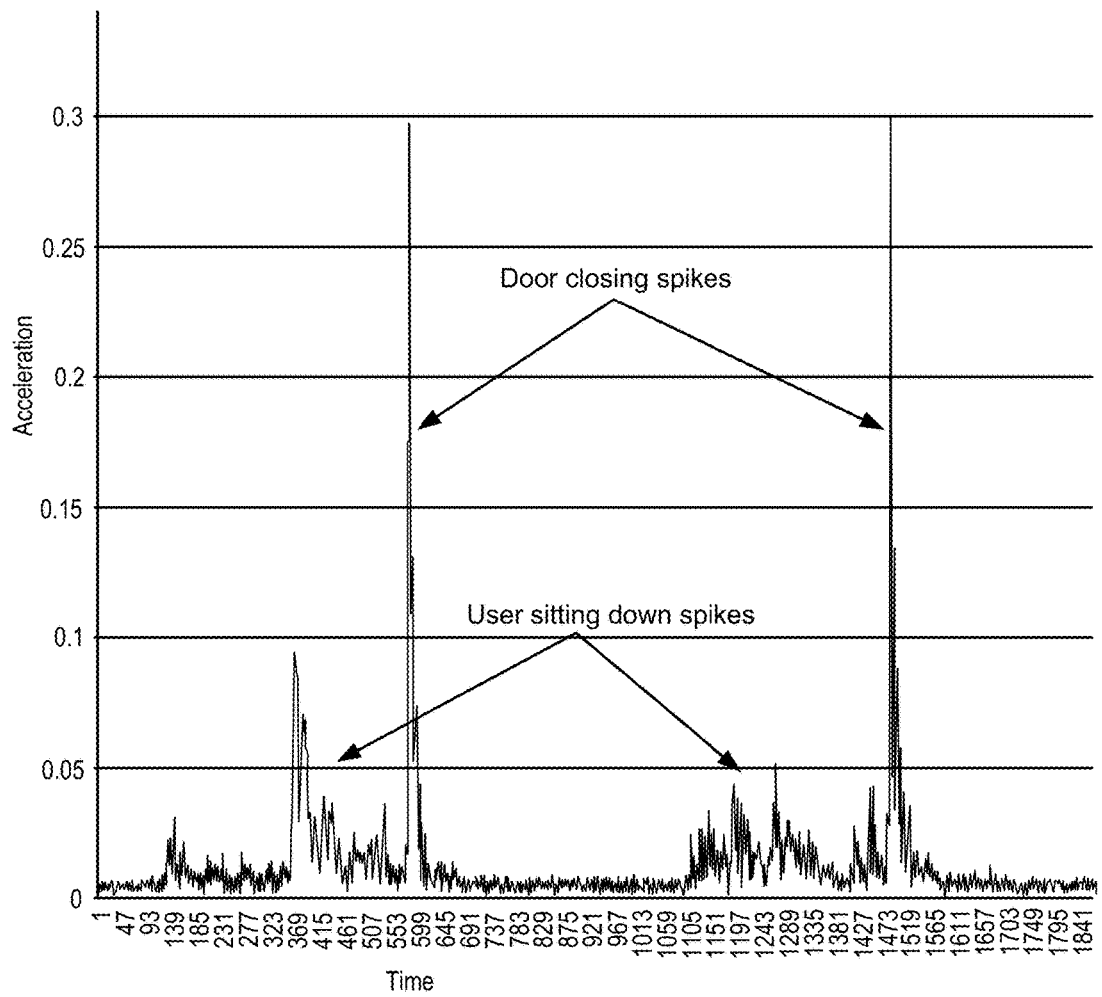
FIG. 17B is a plot illustrating acceleration vs. time for door closing and user sitting events according to an embodiment of the present invention.

FIG. 17A is a simplified flowchart illustrating a method of determining if a user's phone resides with the user by detecting door closing according to an embodiment of the present invention. The method includes determining through which door the user entered the vehicle (1710) using the methods discussed in relation to FIG. 5. The method also includes observing a door closing spike as illustrated in FIG. 17B and discussed below (1712). A determination is made if a second door closing spike is observed with a predetermined time window (e.g. within 60 seconds) (1714). If the second door closing spike is observed, then the conclusion is drawn that the phone is not on the user's person (1716). If, no second door closing spike is observed within the predetermined time period, then the conclusion is drawn that the phone is not on the user's person (1718).

FIG. 17B is a plot illustrating acceleration vs. time for door closing and user sitting down and sitting up events according to an embodiment of the present invention. As illustrated, the acceleration spikes are identifiable by a user's phone when closing a door and when sitting down. These spikes allow for the identification of the location of a user's phone in the vehicle. For example, looking only at the door closing spikes we can determine if a user is actually carrying their phone when entering a vehicle. If a user were to open the back passenger door and place their bag (containing the phone) on the seat, we would observe an acceleration spike like the one shown in FIG. 17A when they closed the door [note that the acceleration observed is (sqrt(x^2+y^2+z^2)]. Then, if they entered the front driver's seat, we would see a user sitting down spike followed by a door-closing spike. These observations would tell us that the user placed the phone in a different location than where they are sitting. We would then use various probabilities to determine the location of the user. For example, there is a high probability that a user would not place their bag in the front seat, only to then sit in the back seat. They would also never place the bag on the driver's seat, only to get in somewhere else. Also, once we determine that the phone is not on the user's person we can then run the centripetal and front/back algorithms to determine where the phone is in the vehicle.

It should be appreciated that the specific steps illustrated in FIG. 17A provide a particular method of determining if a user's phone resides with the user by detecting door closing according to an embodiment of the present invention. Other sequences of steps may also be performed according to alternative embodiments. For example, alternative embodiments of the present invention may perform the steps outlined above in a different order. Moreover, the individual steps illustrated in FIG. 17A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 18A:
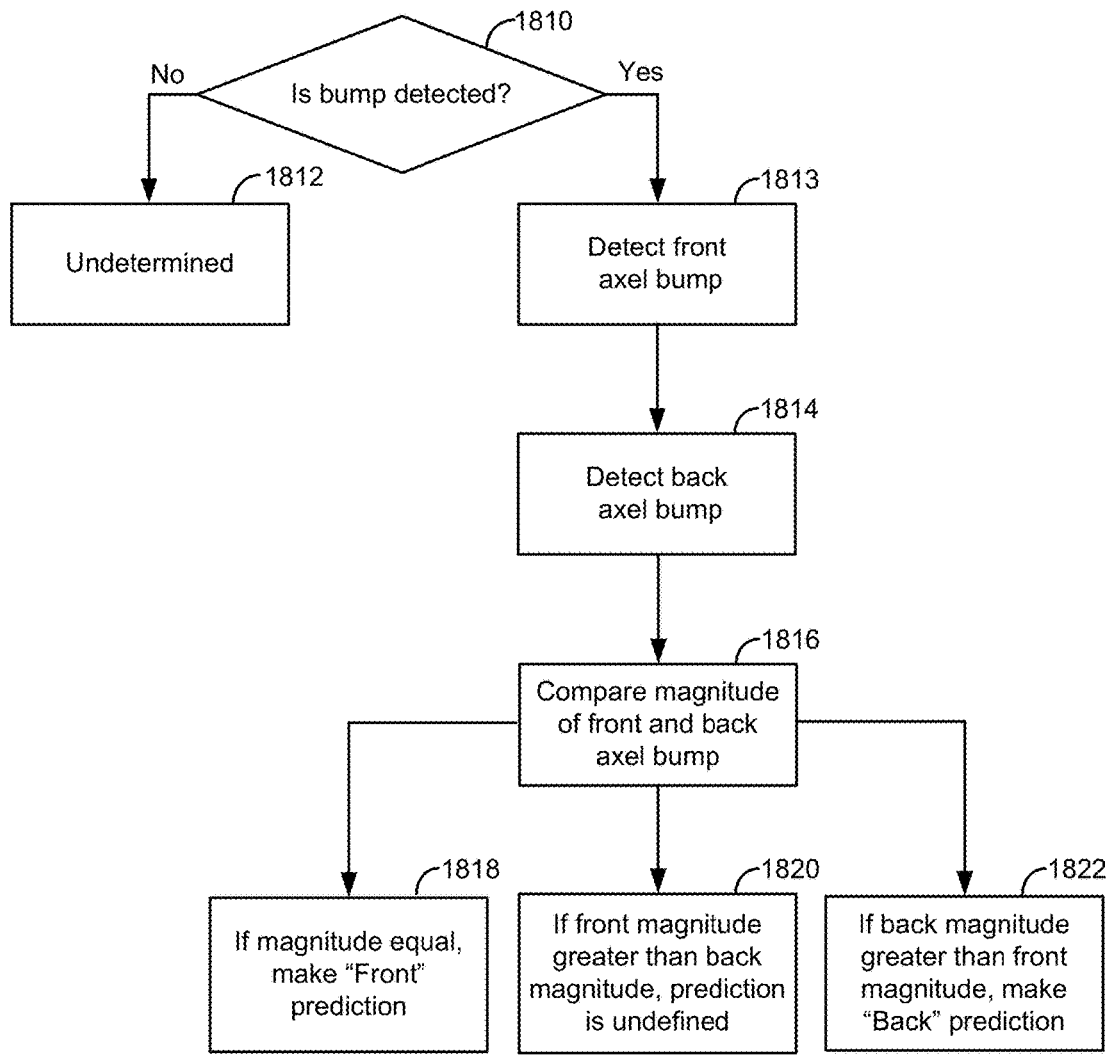
FIG. 18A is a simplified flowchart illustrating a method of determining a location of a phone in a vehicle according to an embodiment of the present invention.

FIG. 18A is a simplified flowchart illustrating a method of determining a location of a phone in a vehicle according to an embodiment of the present invention. The method provides techniques for determining if the phone is in the front or back of the vehicle using bump detection. As will be evident to one of skill in the art, the accelerometer in the phone is capable of detecting bumps in the road. These bumps register differently in the front and back of the vehicle because of the relative position of the seat with respect to the axle. The z-axis direction of the phone is known without orienting the phone because of gravity. This enables the method to measure the bump as a Z acceleration and thereby determine if the phone is in the front or back of the vehicle.

Referring to FIG. 18A, the method includes determining if a bump is detected, with the bumps being associated with a Z acceleration component greater than a given threshold (1810). In some embodiments, a series of bumps may be detected. When a series of bumps is detected, the first bump is associated with the front axle (1813) and the second bump is associated with the rear axle (1814). FIGS. 18B and 18C are plots of Z acceleration data as a function of time for two locations in a vehicle and illustrate differences in the Z acceleration component depending on the location of the phone. If not bump is detected, then the method can produce an undetermined result (1812).

FIGS. 18B and 18C are plots of Z acceleration data as a function of time for two locations in a vehicle. Referring to FIG. 18B, if the phone is in the front of the vehicle, there are two sets of Z acceleration spikes, each registering close to 0.5 g. Referring to FIG. 18C, if the phone is in the back of vehicle), there are two sets of Z acceleration spikes as well, but in this case, the first set of Z acceleration spikes is about 0.5 g and the second set of Z acceleration spikes is over 1 g. Therefore, measurement of these sets of Z acceleration components enables the method to differentiate between cases when the phone is in the front or the back of the vehicle.

Referring once again to FIG. 18A, the magnitude of the front and back axle bumps is compared (1816). If the two sets of Z acceleration spikes are approximately equal in magnitude, then the method makes a "Front" prediction (1818). If the first set of Z acceleration spikes, which are associated with the front axle bump, are less in magnitude than the second set of Z acceleration spikes, which are associated with the rear axle bump, then the method makes a "Back" prediction (1822). Optionally, if the magnitude of the set of Z acceleration spikes associated with the front axle (the first set) is greater than the magnitude of the set of Z acceleration spikes associated with the rear axle (the second set), then the prediction is undefined (1820). One of ordinary skill in the art would recognize many variations, modifications, and alternatives.

It should be appreciated that the specific steps illustrated in FIG. 18A provide a particular method of determining a location of a phone in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 18A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19A:
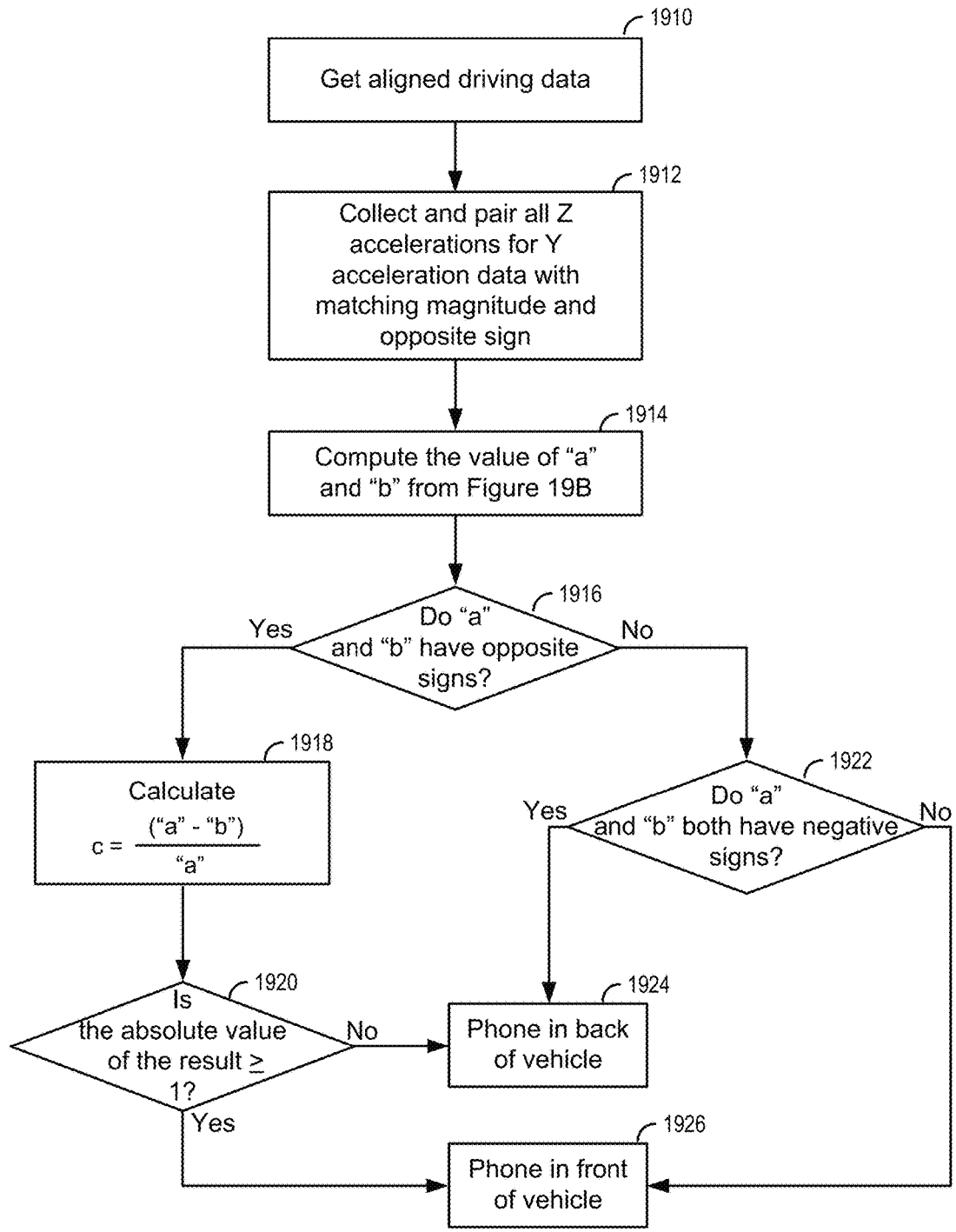
FIG. 19A is a simplified flowchart illustrating a method of determining a front vs. back location of a phone in a vehicle according to an embodiment of the present invention.

FIG. 19A is a simplified flowchart illustrating a method of determining a front vs. back location of a phone in a vehicle according to an embodiment of the present invention. The method illustrated in FIG. 19A can be used to determine if a phone is in the front or back of a vehicle. After getting aligned driving data (1910), we pair all z accelerations corresponding to their matching y accelerations values of the same magnitude but opposite sign (1912). For example, at time T1 we might observe the following acceleration values: (Y=1, Z=0.07). At time T37 we might observe the following acceleration values: (Y=−1, Z=0.03). Since the Y values are the same magnitude but opposite sign, we would pair the corresponding Z values of 0.07 and 0.03. Then we compute the values of "a" and "b" from FIG. 19B where "a"=the sum of all z acceleration values corresponding to positive y acceleration values and "b"=the sum of all z acceleration values corresponding to negative y acceleration values (1914). If the values of both "a" and "b" are positive then we can determine that the phone is in the front of the vehicle (1926). If they are both negative (1922), the phone is in the back of the vehicle (1924). If the signs of "a" and "b" are opposite, then we calculate c=[(a−b)/a] as illustrated in 1918. If the absolute value of this result is greater than or equal to 1, the phone is in the front of the vehicle (1926). Otherwise, it is in the back of the vehicle (1924).

FIG. 19B is a table containing data used in determining the front vs. back location as illustrated in FIG. 19A. As illustrated in FIG. 19B, five different driving sequences are shown with a phone in the back and a phone in the front of a vehicle. The values correspond to the phone accelerations described above and prove the validity of the method.

It should be appreciated that the specific steps illustrated in FIG. 19A provide a particular method of determining a front vs. back location of a phone in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 19A may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 20 is a simplified flowchart illustrating a method of determining if a user is located in the front or back of a vehicle according to an embodiment of the present invention. Referring to FIG. 20, the method uses magnetic fields in making the front/back determination. As discussed in relation to FIG. 5, the two time stamps that define the start and end of a driving sequence are determined (2010). Each of the time stamps are associated with either an entry signal or an exit signal, respectively, Starting at the start time stamp and continuing up to the end time stamp, the method parses the data on a small window incrementing point by point (2012). Over the window, the method uses pattern matching techniques to detect a signature spike in the magnetic field due to the car starting (2014). If this spike is detected, then we know the phone is in the front seat at the time stamp that corresponds the time-stamp the car start magnetic field spike happens (2018). If the car start spike is not detected, then the method is not used to determine the front/back determination (2016).

Thus, this method is used to determine if a phone is in the front or back of the vehicle using magnetic field measurements. It should be noted that the values of magnetic field in the front and the back of the vehicle are different, and that each vehicle will register different values. However, when the car is started the magnetic field spike is detectable in the front of the vehicle and used by the method. This allows us to not only determine if a phone is in the front of the vehicle when the vehicle is started, but it allows us to identify average magnetic field values in the front and back of the vehicle for different vehicles. For example, once we see that a phone is in the front of the vehicle from the "car starting" spike, we can then collect data about the average magnetic field values in the front and the back of the vehicle in question and can compare these values to those in future trips.

It should be appreciated that the specific steps illustrated in FIG. 20 provide a particular method of determining if the phone is located in the front seat during the time the car is started according to an embodiment of the present invention. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of determining a position of a mobile device in a vehicle, the method comprising:

obtaining accelerometer data collected using an accelerometer in the mobile device;

obtaining angular orientation data collected using a gyroscope in the mobile device;

determining a first time span associated with a user of the mobile device entering the vehicle;

determining an entry side for the mobile device based on angular orientation data collected during the first time span, wherein determining the entry side of the mobile device comprises:

providing acceleration data and yaw data, wherein a y-axis of the mobile device is aligned to a longitudinal axis of the vehicle and an x-axis of the mobile device is aligned to a transverse axis that is perpendicular to both the longitudinal axis of the vehicle and acceleration due to gravity;

selecting a subset of the provided acceleration data and yaw data, wherein the subset is associated with the first time span;

predicting the entry side for the mobile device using the subset and an integral method, wherein the integrated method comprises:

determining a sign of an integral of the subset projected onto the x-axis of the mobile device and calculated over the first time span;

predicting that the mobile device enters on the right side of the vehicle if the sign of the integral of the subset is positive;
predicting that the mobile device enters on the left side of the vehicle if the sign of the integral of the subset is negative;
selecting a second subset of the provided acceleration data and yaw data, wherein the second subset is associated with the second time span;
determining a sign of an integral of the second subset projected onto the x-axis of the mobile device and calculated over the second time span;
predicting that the mobile device exits on the left side of the vehicle if the sign of the integral of the second subset is positive; and
predicting that the mobile device exits on the right side of the vehicle if the sign of the integral of the second subset is negative;
selecting a second subset of the provided acceleration data and yaw data, wherein the second subset is associated with a driving time of the driving event; and
predicting a transverse position of the mobile device in the vehicle during the driving tine using a centripetal acceleration method;
detecting an acceleration event;
aligning the mobile device to a reference frame of the vehicle;
determining a front/back location of the mobile device;
detecting a braking event;
determining a second time span associated with the user of the mobile device exiting the vehicle;
determining an exit side for the mobile device based on angular orientation data collected during the second time span; and
determining the position of the mobile device during at least a portion of a driving event occurring between the first time span and the second time span.

2. The method of claim 1 wherein determining at least one of the entry side for the mobile device or the exit side for the mobile device comprises measuring a yaw value for the mobile device associated with the first time span or the second time span.

3. The method of claim 2 wherein measuring the yaw value comprises:
obtaining rotation data collected using the gyroscope in the mobile device, wherein the rotation data is with respect to a vector aligned with acceleration due to gravity; and
detecting a rotation in an x-y plane orthogonal to the vector aligned with acceleration due to gravity, wherein the rotation is greater than a predetermined threshold.

4. The method of claim 2 wherein measuring the yaw value comprises:
obtaining rotation data collected using the gyroscope in the mobile device, wherein the rotation data is with respect to a vector aligned with acceleration due to gravity; and
detecting a rotation in an x-y plane orthogonal to the vector aligned with acceleration due to gravity, wherein the rotation is characterized by a pattern associated with user entry.

5. The method of claim 1 wherein predicting at least one of the entry side or the exit side comprises computing a weighted combination of predictions resulting from a plurality of a vector-product-based method, an integral method, or a seatbelt-based method.

6. The method of claim 1 wherein predicting the transverse position of the mobile device comprises computing a weighted combination of at least a plurality of a yaw method, a centripetal acceleration method, a vector product method, or an integral method.

7. The method of claim 1 wherein determining the front/back location of the vehicle comprises:
obtaining acceleration data associated with a driving time of the driving event, the driving event being characterized by an initial entry signal and a terminal exit signal; and
determining a longitudinal position of the mobile device in the vehicle based on at least one of a bump detection method and a paired Y,Z acceleration method.

8. The method of claim 7 wherein determining the longitudinal position of the mobile device in the vehicle comprises computing a weighted combination of the bump detection method and the paired Y,Z acceleration method.

* * * * *